(12) United States Patent
Sieracki

(10) Patent No.: US 8,805,083 B1
(45) Date of Patent: Aug. 12, 2014

(54) SYSTEM AND METHOD FOR DISCRIMINATING CONSTITUENTS OF IMAGE BY COMPLEX SPECTRAL SIGNATURE EXTRACTION

(76) Inventor: Jeffrey M. Sieracki, Silver Spring, MD (US)

( * ) Notice: Subject to any disclaimer, the term of this patent is extended or adjusted under 35 U.S.C. 154(b) by 257 days.

(21) Appl. No.: 13/052,952

(22) Filed: Mar. 21, 2011

Related U.S. Application Data

(60) Provisional application No. 61/315,980, filed on Mar. 21, 2010.

(51) Int. Cl.
*G06K 9/66* (2006.01)

(52) U.S. Cl.
USPC .......................................... 382/191; 382/190

(58) Field of Classification Search
None
See application file for complete search history.

(56) References Cited

U.S. PATENT DOCUMENTS

| | | | |
|---|---|---|---|
| 5,502,764 | A | 3/1996 | Naccache |
| 5,699,121 | A | 12/1997 | Zakhor et al. |
| 5,764,921 | A | 6/1998 | Banham et al. |
| 6,016,546 | A | 1/2000 | Kephart et al. |
| 6,353,673 | B1 * | 3/2002 | Shnitser et al. ............... 382/103 |
| 6,587,507 | B1 | 7/2003 | Chui et al. |
| 6,625,213 | B2 | 9/2003 | Bottreau et al. |
| 6,628,300 | B2 | 9/2003 | Amini et al. |
| 6,944,222 | B2 | 9/2005 | Van Der Schaar |
| 6,985,526 | B2 | 1/2006 | Bottreau et al. |
| 7,003,039 | B2 | 2/2006 | Zakhor et al. |
| 7,006,567 | B2 | 2/2006 | Frossard et al. |
| 7,020,326 | B1 * | 3/2006 | Hsu ............................... 382/155 |
| 7,120,587 | B2 | 10/2006 | Heusdens et al. |
| 7,245,659 | B2 | 7/2007 | Sekiguchi et al. |
| 7,425,693 | B2 * | 9/2008 | Shapira .......................... 244/3.1 |
| 7,511,643 | B2 | 3/2009 | Baraniuk et al. |
| 7,526,645 | B2 | 4/2009 | Miyazaki et al. |
| 2005/0015600 | A1 * | 1/2005 | Miyazaki et al. ............. 713/176 |
| 2005/0149296 | A1 * | 7/2005 | Sieracki ......................... 702/189 |
| 2006/0241916 | A1 * | 10/2006 | Sieracki ......................... 702/189 |
| 2007/0156471 | A1 | 7/2007 | Moghaddam et al. |

FOREIGN PATENT DOCUMENTS

EP 1371958 12/2003

OTHER PUBLICATIONS

Benedetto, J., et al.; "Wavelet packets for multi- and hyper-spectral imagery"; IS&T/SPIE Electronic Imaging 2010, Wavelet Applications in Industrial Processing VII, 7535 (2010).

(Continued)

*Primary Examiner* — Jason M Repko
*Assistant Examiner* — Jhere Rowland
(74) *Attorney, Agent, or Firm* — Rosenberg, Klein & Lee

(57) ABSTRACT

A system and method are provided to operate upon image data electronically captured with complex spectral content in a plurality of image data pixels within a spatial image plane. A plurality of reference components are provided. A discovery processor is coupled to the general dictionary, and is programmably configured to execute a simultaneous sparse approximation process upon image data pixels of at least a portion of the captured image. The discovery processor discovers therefor a set of core spectral signatures defined in terms of selected reference components from the general dictionary. A match processor programmably configured to execute a selective matching process is also provided for transforming individual image data pixels into linear combinations of selected core spectral signatures. The constituent features of the captured image portion corresponding to the selectively matched core spectral signatures are discriminated according to the linear combination thereof.

28 Claims, 19 Drawing Sheets

(56) References Cited

OTHER PUBLICATIONS

Bergeaud, F., et al.; "Matching Pursuit of Images"; ICIP '95 Proceedings of the 1995 International Conference on Image Processing (vol. 1).

Bijaoui, A; "Multispectral Analysis based on Wavelet Fusion & Sparse Decomposition"; Presentation at the Astronomical Data Analysis 5th Conference (ADA5), May 7-9, 2008.

Bronstein, M., et al.; "Blind Deconvolution of Images using Optimal Sparse Representations"; IEEE Transactions on Image Processing; 14(6):726-736, 2005.

Bruckstein, A., et al.; "From Sparse Solutions of Systems of Equations to Sparse Modeling of Signals and Images"; SIAM Review, vol. 51, No. 1, pp. 34-81, Feb. 2009.

Bruckstein, A., et al.; "On the Uniqueness of Nonnegative Sparse Solutions to Underdetermined Systems of Equations"; IEEE Transactions on Information Theory; vol. 54, No. 11, pp. 4813-4820, Nov. 2008.

Bultan, A.; "A Four-Parameter Atomic Decomposition of Chirplets"; IEEE Trans. Signal Processing, vol. 47, pp. 731-745, Mar. 1999.

Charles, A., et al.; "Learning Sparse Codes for Hyperspectral Imagery"; Journal of Selected Topics in Signal Processing, 2011. In press.

Chen, M., et al.; "Image Fusion Based on Extensions of Independent Component Analysis"; International Society for Photogrammetry and Remote Sensing; Commission VII—Thematic Processing, Modeling and Analysis of Remotely Sensed Data (2008-2012), Working Group WG VII/6—Remote Sensing Data Fusion; http://www.isprs.org/proceedings/XXXVII/congressf7_pdf/6_WG-VII-6/10.pdf; Jun. 2008.

Davis, G., et al.; "Adaptive greedy approximations"; Constructive Approximation, vol. 13, No. 1, pp. 57-98, 1997.

Demir, B., et al.; "Empirical Mode Decomposition Preprocess for Higher Accuracy Hyperspectral Image Classification"; IEEE International Conference on Geosience and Remote Sensing Symposium, Boston, Massachusetts, USA, 2008, pp. II-939-II-941.

Donahue, M., et al.; "Sparse Representations for Image Decompositions with Occlusions"; IEEE Conference on Computer Vision and Pattern Recognition, vol. 1, 1996, pp. 7-12.

Ghaffari, A., et al.; "Sparse Decomposition of Two Dimensional Signals"; IEEE International Conference on Acoustics, Speech, and Signal Processing, (ICASSP'09), pp. 3157-3160; Apr. 19-24, 2009.

González-Audicana, M., et al.; "Comparison between Mallat's and the 'á trous' discrete wavelet transform based algorithms for the fusion of multispectral and panchromatic images"; International Journal of Remote Sensing, vol. 26, No. 3, pp. 597-616; Feb. 2005.

Gribonval, R., et al.; "Atoms of all channels, unite! Algorithms for multichannel sparse representations"; http://www.cirm.univ-mrs.fr/videos/2007/exposes/25/Gribonval.pdf; Sep. 2007.

Gribonval, R., et al.; "Atoms of all channels, unite! Average case analysis of multi-channel sparse recovery using greedy algorithms"; Tech. Rep. IRISA No. 1848, IRISA, 2007.

Gribonval, R.; "Sparse decomposition of stereo signals with matching pursuit and application to blind separation of more than two sources from a stereo mixture"; Proc. Int. Conf. Acoust. Speech Signal Process (ICASSP 02), Orlando, May 2002.

Leviatan, D., et al.; "Simultaneous Approximation by Greedy Algorithms," Univ. South Carolina at Columbia, Dept. Math., Columbia, SC, IMI Rep. 2003:02, 2003.

Li, Y. et al.; "Underdetermined Blind Source Separation Based on Sparse Representation"; IEEE Transactions on Signal Processing, vol. 54, No. 2, pp. 423-437, Feb. 2006.

Mallat, S., et al.; "Matching Pursuits with Time-Frequency Dictionaries," IEEE Transactions on Signal Processing, 41 (1993)3397-3415.

Mohimani, H., et al.; "A fast approach for overcomplete sparse decomposition based on smoothed $\ell 0$ norm"; IEEE Transactions on Signal Processing, vol. 57, No. 1, pp. 289-301, Jan. 2009.

Nikolov, S., et al.; "Wavelets for image fusion"; Chapter 1 of Wavelets in Signal and Image Analysis, from Theory to Practice; A. Petrosian and F. Meyer, editors; Kluwer Academic Publishers, 2001.

Ramirez, I., et al.; "Classification and Clustering via Dictionary Learning with Structured Incoherence and Shared Features," in CVPR, Jun. 2010.

Rodriguez, F., et al.; "Sparse representations for image classification: Learning discriminative and reconstructive non-parametric dictionaries"; Technical report, University of Minnesota, IMA Preprint 2213, Jun. 2008.

Sadler, B., et al.; "Optimal and wavelet-based shock wave detection and estimation"; Acoustical Society of America Journal, 104:955-963, Aug. 1998.

Shippert, P.; "Introduction to Hyperspectral Image Analysis," Online Journal of Space Communication; http://spacejournal.ohio.edu/pdf/shippert.pdf, 2003.

Sieracki, J., et al.; "Greedy adaptive discrimination: component analysis by simultaneous sparse approximation"; Proc. of SPIE, vol. 5914, pp. 59141R, 2005.

Smith, R.; "Introduction to Hyperspectral Imaging"; http://www.microimages.com/documentation/Tutorials/hyprspec.pdf; Jan. 2010.

Sprechmann, P., et al.; "Dictionary learning and sparse coding for unsupervised clustering"; IMA Preprint 2281, Sep. 2009.

Starck, J., et al.; "Very High Quality Image Restoration by Combining Wavelets and Curvelets," Proc. SPIE Conf. Signal and Image Processing: Wavelet Applications in Signal and Image Processing IX, vol. 4478, pp. 9-19, Aug. 2001.

Sugden, P., et al.; "Underdetermined noisy blind separation using dual matching pursuits," in Proc. ICASSP, 2004, pp. 557-560.

Tropp, J.; "Greed is good: Algorithmic Results for Sparse Approximation"; IEEE Transactions on Information Theory, vol. 50, No. 10, pp. 2231-2242, Oct. 2004.

Tropp, J., et al.; "Improved sparse approximation over quasi-incoherent dictionaries"; 2003 International Conference on Image Processing, ICIP 2003, Proceedings, vol. 1 pp. I-37-40; Sep. 14-17, 2003.

Tropp, J., et al.; "Algorithms for simultaneous sparse approximation. Part I: Greedy pursuit," Signal Processing, vol. 86, pp. 572-588, 2006.

Tropp, J.; "Algorithms for simultaneous sparse approximation. Part II: Convex relaxation," Signal Processing, vol. 86, pp. 589-602, 2006.

Valiollahzadeh, S., et al.; "Hyperspectral Data Reconstruction Combining Spatial and Spectral Sparsity"; Computational & Applied Mathematics, Rice University; Technical Reports; http://www.caam.rice.edu/~wy1/paperfiles/Rice_CAAM_TR10-29_Hyperspectral.PDF; Nov. 2010.

Yu, G., et al.; "Image modeling and enhancement via structured sparse model selection"; In ICIP, 2010.

Zelinski, A., et al.; "Denoising Hyperspectral Imagery and Recovering Junk Bands using Wavelets and Sparse Approximation," in IEEE Int. Geosci. Remote Sensing Symp. (IGARSS 2006), Denver, Aug. 2006, pp. 387-390.

\* cited by examiner

US 8,805,083 B1

SYSTEM AND METHOD FOR DISCRIMINATING CONSTITUENTS OF IMAGE BY COMPLEX SPECTRAL SIGNATURE EXTRACTION

RELATED APPLICATION DATA

This application is based on Provisional Patent Application No. 61/315,980, filed 21 Mar. 2010.

BACKGROUND OF THE INVENTION

The present invention is directed to a system and method for image processing and signature detection. More specifically, the present invention is directed to a system and method whereby constituents of an image electronically captured with complex spectral content are discriminated by automatic spectral signature extraction. A set of defining spectral elements of captured image portions are determined, and the complex spectral contents, or the multi- or hyper-spectral pixels, of the image are represented as combinations thereof. The present invention is directed, moreover, to a system and method wherein image pixels are represented responsive to variations from known signatures in a database and automatically adapted to suit certain lighting conditions and other artifact inducing aspects of the imaging process, such that constituent features of the captured image may be accurately discriminated. Among other things, this enables a reduction of pixel information to discover a list of novel signatures or to refine any particular signature for better processing of any particular data capture instance.

This invention utilizes certain aspects of methods and systems previously disclosed in U.S. patent application Ser. No. 10/748,182, (now U.S. Pat. No. 7,079,986) entitled "Greedy Adaptive Signature Discrimination System and Method" and that filing is hereby incorporated by reference and hereinafter referred to as [1], as well as certain aspects of methods and systems previously disclosed in U.S. patent application Ser. No. 11/387,034, entitled "System and Method For Acoustic Signature Extraction, Detection, Discrimination, and Localization" that is hereby incorporated by reference and hereinafter referred to as [2].

SUMMARY OF THE INVENTION

It is an object of the present invention to provide a system and method for automatically and accurately discriminating constituents of an image electronically captured with complex spectral content.

It is another object of the present inventions to provide a system and method for automatically and accurately discriminating constituents of an image electronically captured with multi- or hyper-spectral image pixels.

These and other objects are attained by a system and method formed in accordance with the present invention for processing electronically captured images formed by a plurality of spectral components. The system and method operate upon image data electronically captured with complex spectral content in a plurality of image data vectors defined (preferably as pixels) with respect to a spatial image plane. A plurality of reference components are provided; and, a discovery processor is programmably configured to execute a simultaneous sparse approximation process upon image data vectors of at least a portion of the captured image. The discovery processor discovers therefor a set of core spectral signatures defined in terms of selected reference spectral components. A programmably configured match processor is provided to selectively match at least one individual image data vector to at least a portion of the core spectral signature set to represent the image data vector as a linear combination thereof. Constituent features of the captured image portion corresponding to the selectively matched core spectral signatures are thereby discriminated according to the linear combination thereof.

In certain embodiments, a general dictionary is provided whose pre-stored elements include the reference components. In other embodiments, the general dictionary is provided with at least some elements generated on the fly from parametric information. Depending upon the embodiment, the elements may include any well defined group of smooth functional elements or random vectors.

DETAILED DESCRIPTION OF THE PREFERRED EMBODIMENTS

Briefly, the subject system and method provide for the spectral processing of electronically captured images for the accurate discrimination of its image constituents. In this regard, the system and method provide for the processing of images electronically captured with complex spectral content by automatic spectral signature extraction. The images are captured to contain multi- or hyper-spectral pixels, each of which accordingly contains a complex composite of spectral components. Thus, a captured image is collectively formed by an array of pixels, with each pixel containing a spatial 'slice' of the composite image data. Image data pixels are processed to determine a set of defining spectral elements of one or more captured image portion. The system and method preferably operate upon image data pixels first to discover a set of defining spectral elements according to which at least a portion of the captured image may be represented. These defining spectral elements are automatically discovered with reference to a pre-established dictionary of known spectral signatures, and serve as core spectral signatures stored in a further, more refined signature dictionary. The subject system and method then detect, or match, individual image pixels with reference to the refined signature dictionary, preferably representing them as linear combinations of core spectral signatures from the refined signature dictionary.

In certain exemplary embodiments, the discovery of defining spectral elements, or core spectral signatures for the signature dictionary, is carried out according to a simultaneous sparse approximation process executed upon one or more grouped sets of image pixels. In certain embodiments, a representative signature is discovered for each grouped set of image pixels as a parametric mean thereof in accordance with a greedy adaptive decomposition (GAD) type of simultaneous sparse approximation. Preferably, measures are automatically taken in accordance with the simultaneous sparse approximation process employed to adapt to varied lighting conditions and other artifact-inducing aspects of the imaging process by which a given image was captured.

The defining spectral elements correspond to constituent features of the captured image portions. Reliable discovery of such defining spectral elements thereby yield accurate detection and discrimination of the constituent features from the composite image data at the portions.

Figure 1A:
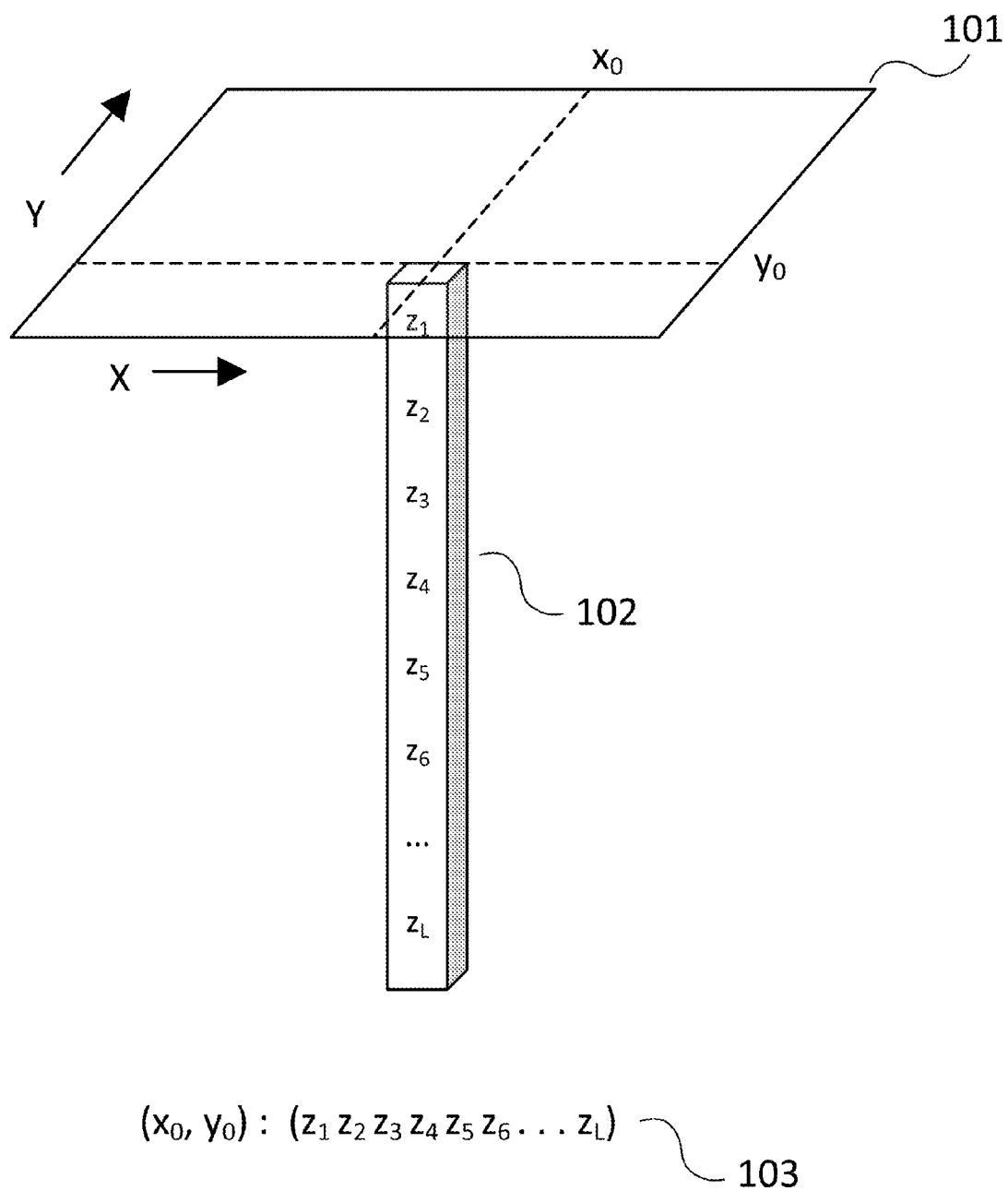
FIG. 1A is schematic diagram illustratively representing a pixel of image data having complex spectral content within a spatial image plane of pixels.

Turning now to FIG. 1A, the image data processed in accordance with the present invention is captured by suitable means known in the art as multi- and hyper-spectral images. Such images may be recorded, for instance, with a filtering system that permits measurements of amplitudes of a comparatively large number of wavelengths. Where typical imaging systems (e.g. a digital camera) record intensity information at three or four bands (e.g. red, green, and blue), multi-spectral systems record additional bands (such as near infrared (IR), or for finer gradations of color). So called hyper-spectral systems further divide the light and IR spectrum into very fine steps and record intensities, sometimes in hundreds of distinct color bands. Related systems may include additional capabilities to measure intensity in bands outside visual wavelengths, including near and far IR and UV, x-ray, and so forth. In such systems, a vector of intensities is typically recorded for each (x, y) pixel location in the image. The resulting dataset is often referred to as a hypercube or data cube. By fixing a point (x, y) and examining the pixel data there, one would in effect be examining the frequency spectra of the pixel as sampled at the predefined bands of the system.

FIG. 1A schematically illustrates one way to visualize the hyper- or multi-spectral image data. A spatial image plane 101 is established with pixel coordinates defined along X and Y directions. For each specific pixel $(x_0, y_0)$ there is a column of data 102 that represents the spectral samples. The column in the illustration represents a vector with L elements. In a typical grayscale image, L=1; in a typical color computer image, L=3; and, in multi-spectral image, L>3. "Hyper-spectral" is a term of art generally applied for images of even greater L, typically (but not necessarily) on the order of L>100.

Figure 1B:
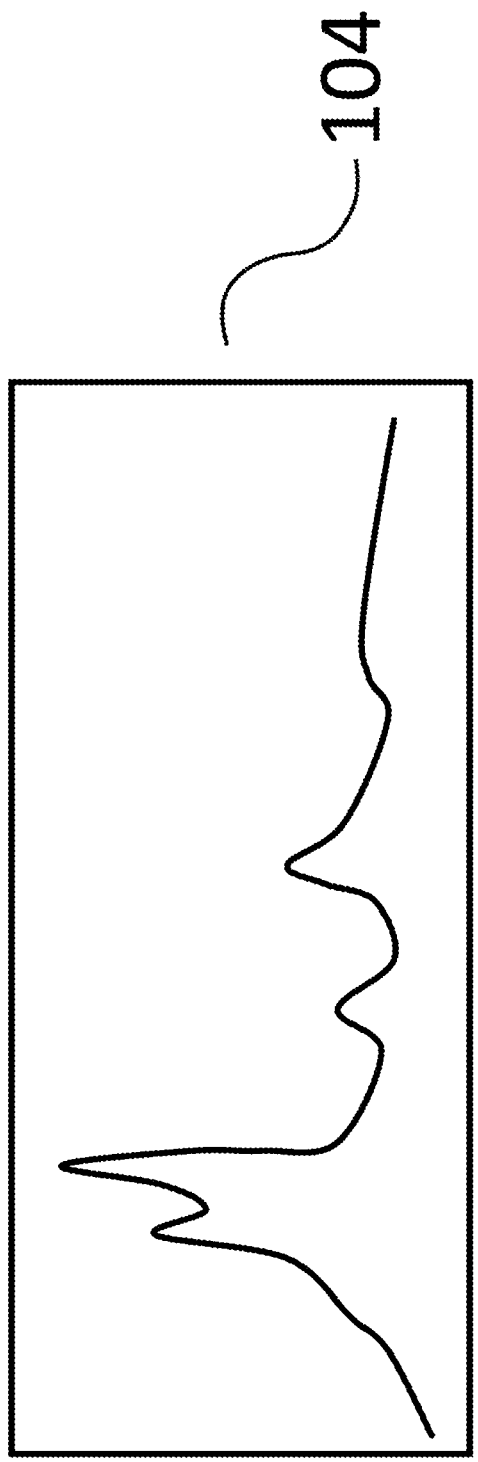
FIG. 1B graphically illustrates an example of a spectrum corresponding to an image pixel vector in the spatial image plane of FIG. 1A.

Each and every pixel in the X, Y plane may be mapped to a vector 103, as illustrated. A list of points on the spatial image plane 101 then maps to a list of vectors, which list of vectors may be treated as a list of signals and grouped and accordingly processed with signal processing measures according to the particular requirements of the intended application. As illustrated in FIG. 1B, the vector 103 may also be considered a spectrum 104 measured at the pixel $(x_0, y_0)$ since each value in the vector typically represents an amplitude measured within a distinct wavelength bin.

A "signature" is a pattern within a signal or data stream that may be associated with a condition of interest in the signal generating system. A significant problem in the analysis of hyper- and multi-spectral images is the accurate and proper identification of the spectral signatures present in each pixel. One example of the numerous applications where such problem arises is in identifying the makeup of physical materials presented in a particular image pixel. One challenge is that fine distinctions must be made between constituent image elements. Examples include, distinguishing the difference between green plastic and visually similar green leaves captured in a given image pixel, distinguishing between one type of vegetation and another constituent to the image pixel, and the like.

Adding to the challenge is the fact that pixels often comprise a summation of multiple different spectra because a composite mixture of materials is present in the spatial area spanned by the pixel. In a low resolution situation, for instance, a single pixel may include elements of a tree leaves, tree trunk, and underbrush. In some situations, the mix is inherent. An imaged portion of asphalt road, for example, may have rubber tire marks on it, thus bringing aspects of both corresponding spectra into the reflected spectrum. Factors external to the imaged elements such as lighting angles and illumination type may significantly change the observable spectra and thereby hinder proper identification of spectral signatures.

In order to recover an initial approximation of the underlying spectra in mixed pixels, it is straightforward to apply various known signal-processing techniques to decompose the spectra into component parts. One technique of interest is the known Matching Pursuits approach, which may be applied to decompose a signal in a greedy fashion with respect to a general dictionary of known spectra. By providing such general dictionary of known spectra, the decomposition will initially predict the effective proportions of known spectra that are present in the spectra measured in a mixed pixel, thus "de-mixing" the pixel's data and providing an estimate of the relative proportions that constituent materials imaged in the pixel contribute to the measured spectra. The result for each pixel will be a linear decomposition similar to:

$$f_{x1,y1} = a_{x1,y1}S1 + b_{x1,y1}S2 + c_{x1,y1}S3 + \ldots + R_{x1,y1} \tag{1}$$

where $f_{x1,y1}$ represents the measured spectra at pixel (x1, y1), and S1, S2, etc. represent spectral signature elements from the known general dictionary. R represents the residue or error left, if any, when the approximation process is terminated. This residual component R is typically assumed to be noise in the system, however, in some instances it may also be further treated to evaluate the success of the decomposition at a given step, or to search for additional information. Depending on the requirements of a particular application, the value of R may serve as suitable indicia in this regard.

In the example shown, three decomposition steps are illustrated. The terms $a_{x1,y1}$, $b_{x1,y1}$, $c_{x1,y1}$ for each of the known spectral components S1, S2, S3 represent coefficients discovered by the Matching Pursuits technique at each of three Matching Pursuits steps corresponding to the known spectral components. Any number of steps may be taken, to the exhaustion of the prototype elements in the signature dictionary, with each step in the Matching Pursuits operation reflected as an additional term in the decomposition of Eq. (1). If S1, S2, and S3 were, for example, to represent spectra for three different materials, then the degree to which each material is present and contributing to the spectra may be estimated to be proportional to the coefficients $a_{x1,y1}$, $b_{x1,y1}$, $c_{x1,y1}$.

Matching pursuits is often applied with a large, redundant general dictionary so that a minimal sparse approximation may be obtained with respect to only a few elements of the dictionary. However, it may also be applied with only a small finite dictionary. In the case of signal spectra, each greedy step operates somewhat like a matched filter, choosing from the dictionary the spectral signature best-fit to the test vector and removing this fit from the test vector to form the test vector for the next step.

By varying the number of steps taken in Matching Pursuits, the number of materials hypothesized to be present may be constrained. This may also be done after the fact. For example, Matching Pursuits may be executed using a dictionary of known spectra of materials to convergence, or alternatively to the exhaustion of dictionary elements, recording (for example) several hundred elements (each defined by a coefficient and dictionary spectrum) in a structure book. The structure book may then be examined to keep only those elements having coefficients satisfying a desired condition—such as only those structure book elements whose coefficient values are larger than some fixed cutoff threshold. In another example, only the first N elements, say for instance N=5, may be kept to limit the predicted mix to a certain number of constituent spectra—such as where no more than 5 materials (each represented by one spectral signature from the dictionary) are hypothesized to be found in the pixel. Setting N=1 would correspond to finding but a single best-fit spectral signature.

Yet another example of how the structure book elements to be kept may be determined is to monitor for abrupt drops in coefficient values. Considering for example the case in which the first two coefficients are relatively large while the third and subsequent coefficients drop to significantly smaller values—such may be an indication that only the first two spectra are significant factors in the measured spectrum. Dynamic thresholding may be effected in this manner.

Other methods of rescaling may be applied to compensate for "background" levels. For example, by rescaling in accordance with methods taught in [1], it may be determined that the largest spectral elements with the largest coefficients are not always the most significant. Dominant background material spectra, lighting and illumination, and such other conditions may very well render spectral components discovered later in the greedy process more important than those discovered earlier.

Figure 6A:
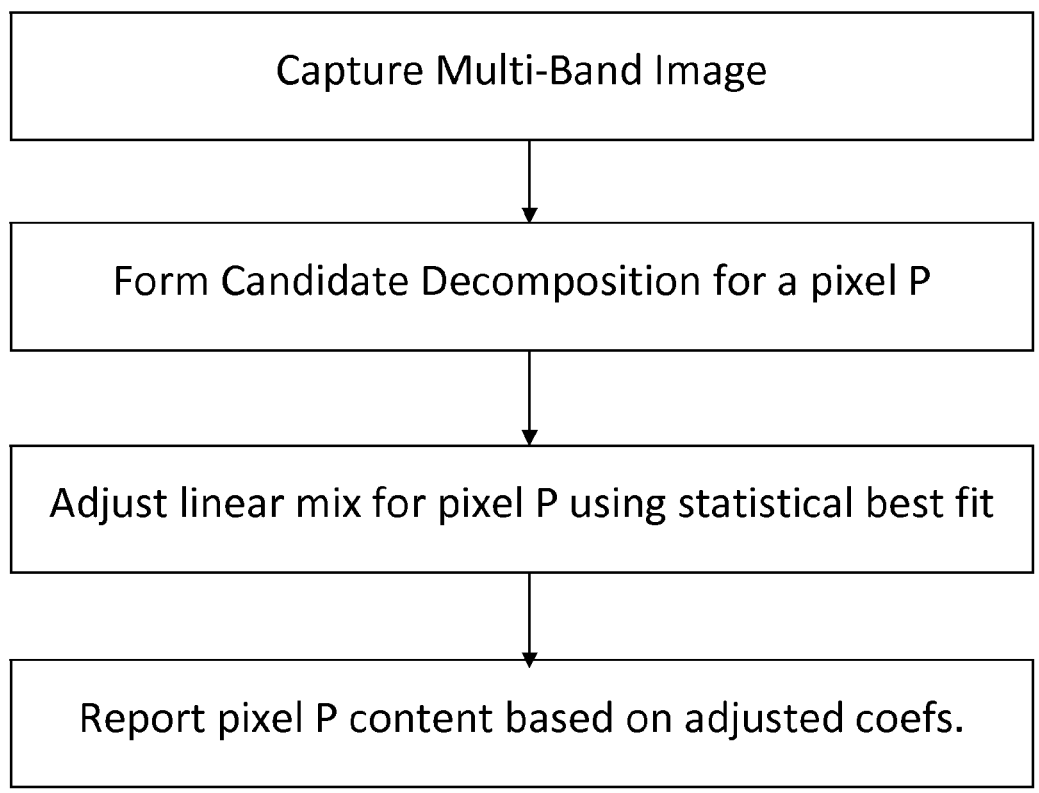
FIGS. 6A-6C are flow diagrams illustrating flows of processes whereby a linear mix of core spectral components is adjusted in decomposing one or a group of image data pixels in different examples of detection processing according to alternative embodiments of the present invention.
Figure 6B:
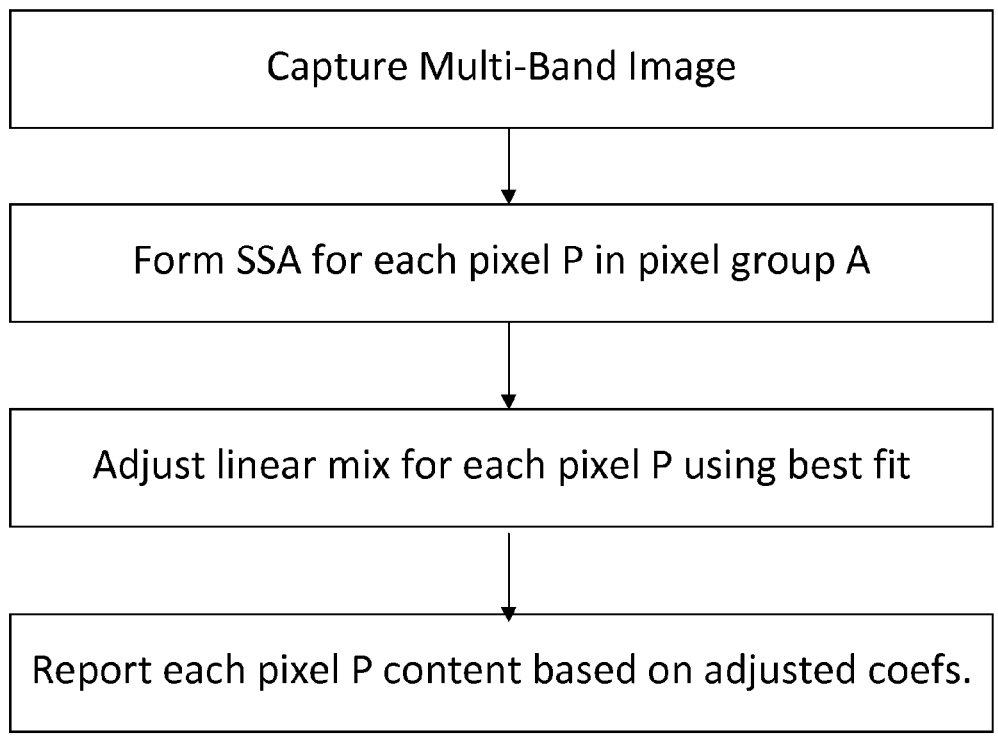
Figure 6C:
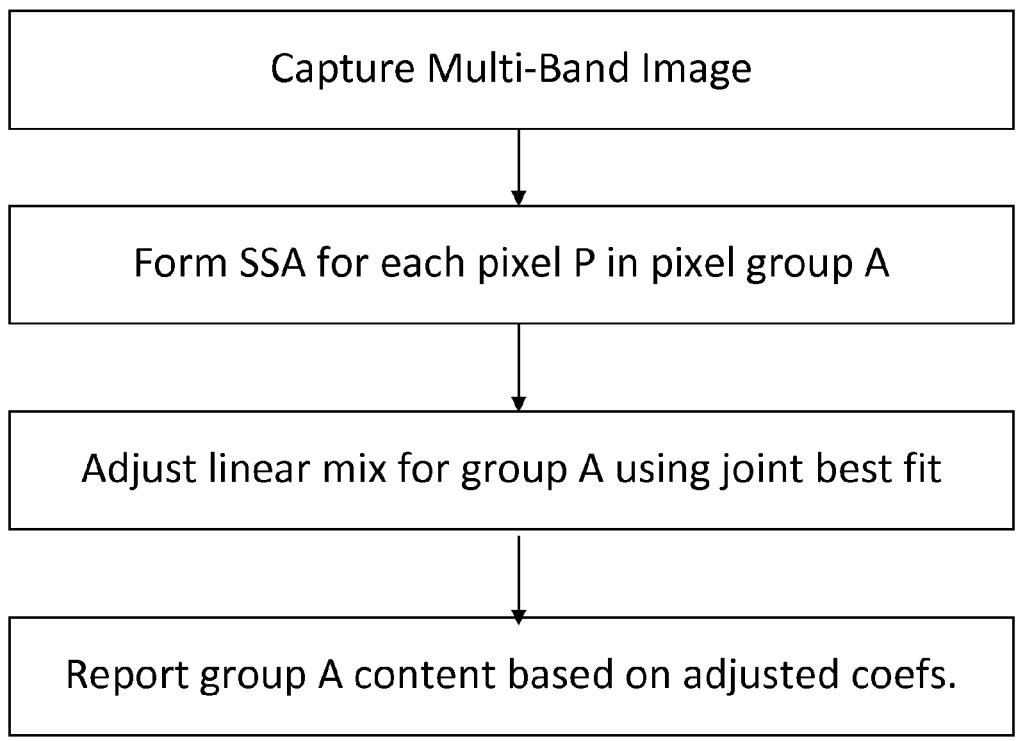

Furthermore, spectra generally tend not to be linearly independent. Hence, in order for the coefficients to accurately reflect relative compositions, multiple hypotheses for relative mixing of component spectra are preferably tested to adjust for the portions of the spectra that overlap with others in the same mix. In accordance with a preferred embodiment of the present invention, the given processing first discovers the most likely underlying components by means of Matching Pursuits or similar decomposition technique, or where appropriate, by means of a simultaneous sparse approximation (SSA) based on a group of data (as described in following paragraphs). A linear mixing model is preferably used to adjust coefficients ($a_{x1,y1\ etc.}$ in the above example) to reflect the most likely mix of the discovered components to generate the particular observed spectra. In certain embodiments, this adjustment may not be necessary, as it may be intrinsic to the particular decomposition process employed. FIGS. 6A-6C illustrate examples of such adjustment of linear mix during detection processing in three different situations: upon individual decomposition of each pixel (FIG. 6A); upon SSA (such as GAD) for a group of pixels jointly, with an adjusted linear mix being detected/reported for each individual pixel (FIG. 6B); and, also upon SSA (such as GAD) for a group of pixels jointly, but with the given statistical process jointly assuming the adjusted linear mix to apply to the entire pixel group (the pixel group assumed to be substantially identical) (FIG. 6C).

This adjustment of coefficients may be accomplished using any suitable statistical means known in the art, once the problem is formulated (upon determination of components). If necessary, additional constraints may be required to distinguish between multiple alternative mixing coefficients that result in similar measured spectra.

Figure 7A:
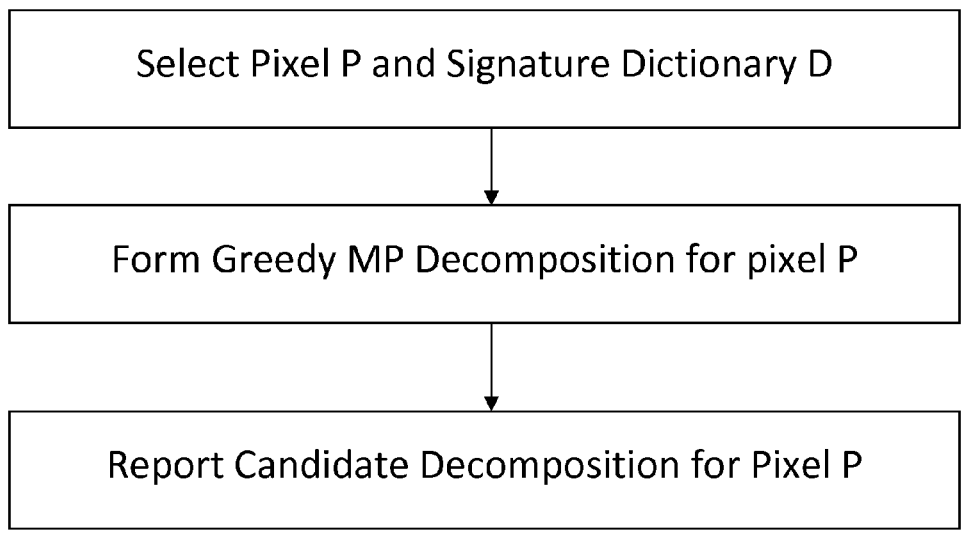
FIGS. 7A-7C are flow diagrams illustrating flows of processes whereby a dictionary is accessed in different examples of processing according to alternative embodiments of the present invention.
Figure 7B:
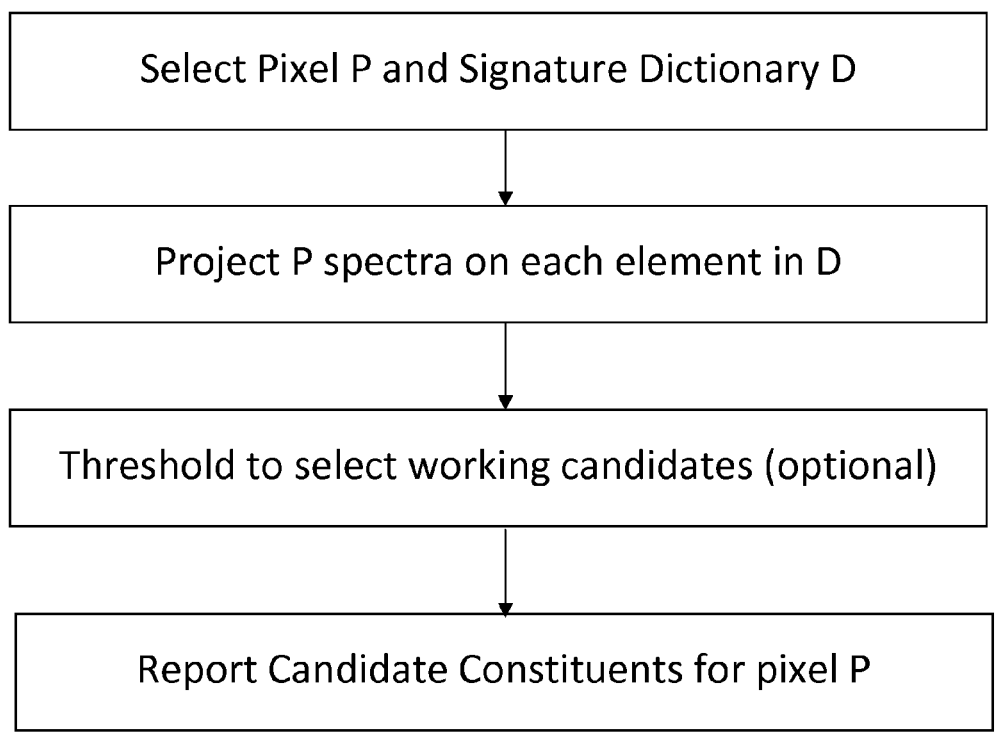

FIG. 7A illustrates the general flow of processes in accordance with the preceding embodiment, where a Matching Pursuits type decomposition is applied on an individual pixel basis. In accordance with an alternate embodiment of the matching process, Matching Pursuits decomposition is replaced with simultaneous matched filtering, such as illustrated in FIG. 7B. The main difference in this alternate approach is that previously discerned matches are not removed from the spectrum for subsequent matching steps, as in the greedy style approach. Rather, coefficients for each possible signature are determined independently (in the manner of a single Matching Pursuits step), and candidate component spectra are selected based on their ranked magnitudes.

Figure 7C:
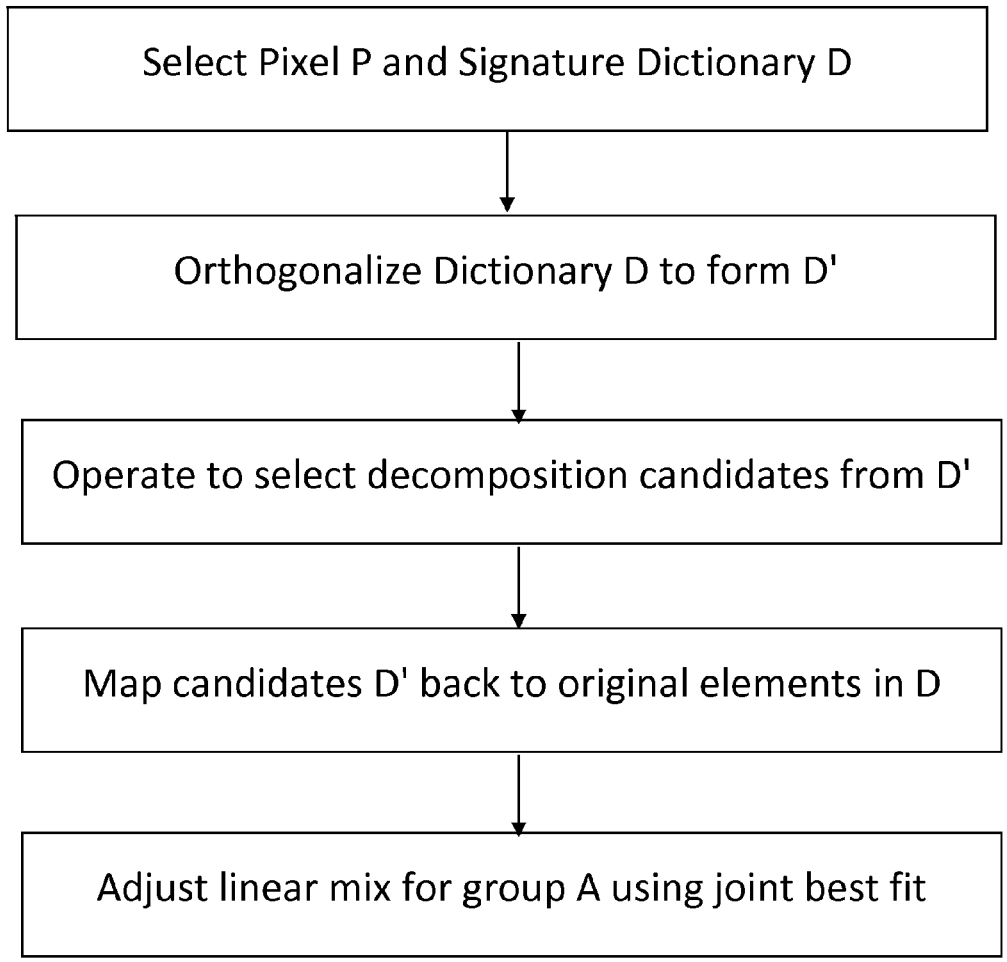

In another alternate embodiment, only a pre-conditioned signature dictionary is consulted, such as illustrated in FIG. 7C. Each overlapping component of each signature is removed so that the resulting spectral signature dictionary elements become linearly independent (or by further processing, orthogonal) with respect to one another. This spectral signature dictionary is then available for use to discover candidate components. Subsequently, the mixing hypotheses based on combining the full signature spectra would be tested as above. Note that the process of conditioning the dictionary may be conducted in advance of processing, explicitly producing a new dictionary. Alternatively, as will be understood by those skilled in the art, it may be conducted in the course of performing a greedy approximation such as Matching Pursuits. For example, the selected set of dictionary elements may be orthogonalized at each step with respect to previous steps by Gram-Schmidt, so that the selection sequence S1, S2, etc of non-orthogonal elements results in application of a related set S1', S2', S3', etc that are orthogonal.

Figure 2:
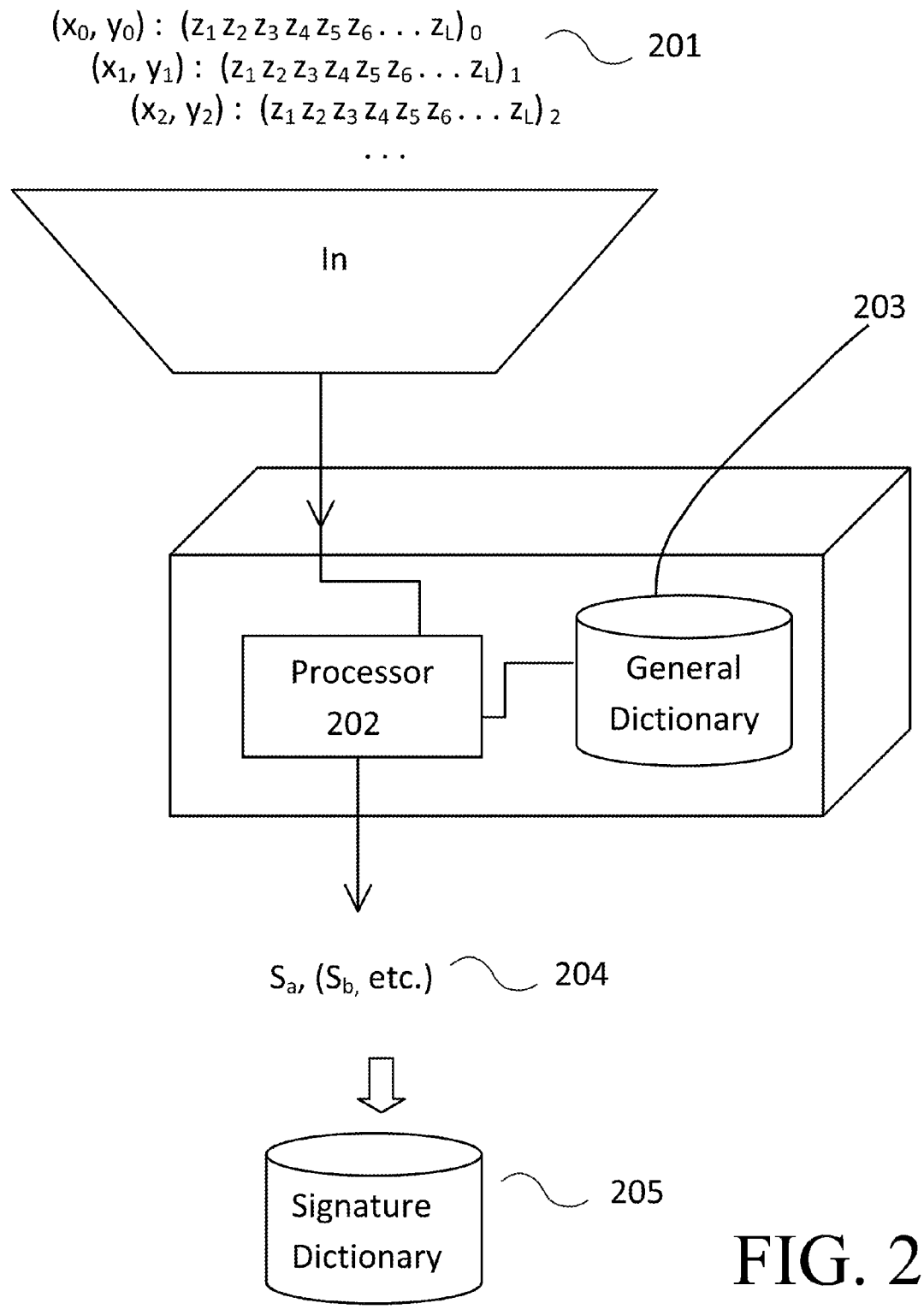
FIG. 2 is block diagram schematically illustrating an interconnection of system modules and flow of data within a discovery processing portion in accordance with one exemplary embodiment of the present invention.
Figure 3:
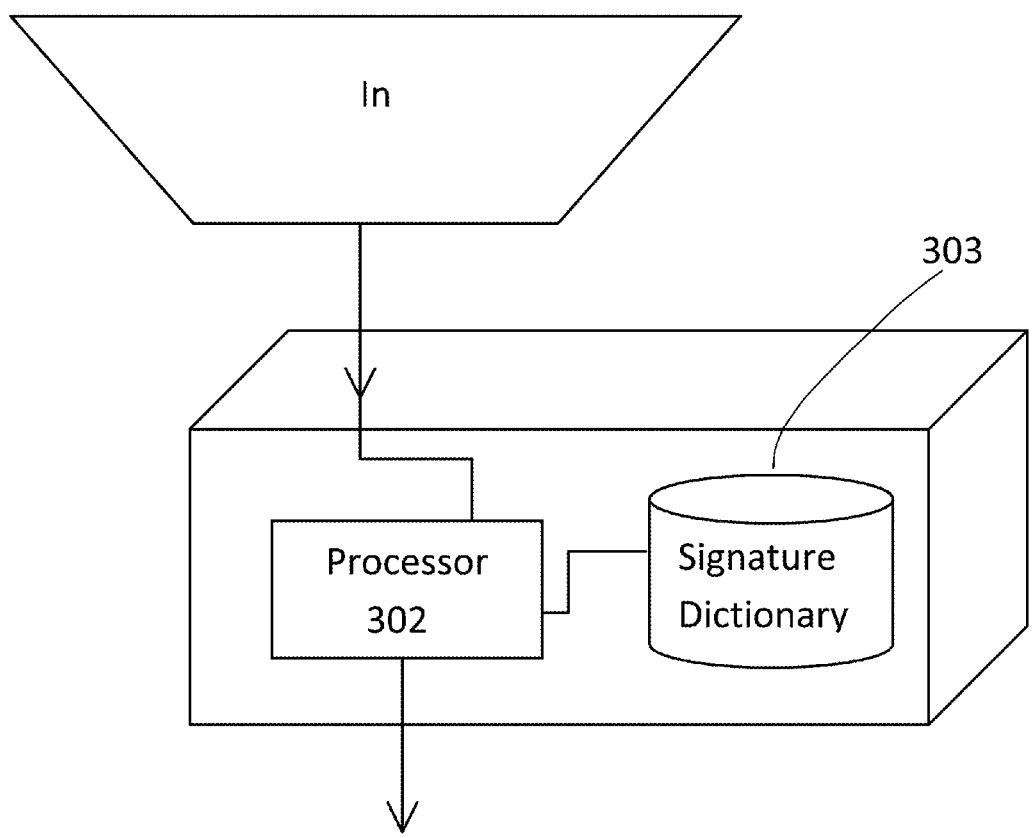
FIG. 3 is block diagram schematically illustrating an interconnection of system modules and flow of data within a detection processing portion in accordance with one exemplary embodiment of the present invention.

Referring preliminarily to FIG. 3, there is illustrated an exemplary embodiment of detection processing for pixel data vectors 301 based on a spectral signature dictionary generated in accordance with certain aspects of the present invention. The pixel data vectors 301 are processed to recover decompositions of each in terms of candidate signature spectra, as represented by the vectors of coefficients 304 (for a linear combination of the signature spectra). A processor 302 is programmably configured to execute a Matching Pursuits type operation, SSA operation (or other alternative as discussed above) with reference to discovered spectral signatures contained in the signature dictionary 303, generated as described in connection with FIG. 2. Depending on the requirements of the intended application, processor 302 may be realized as part of the same processing engine implementing processor 202 for discovering spectral signatures, or in a separate processing engine. The vectors 304 represent decompositions of the pixel data vectors 301 in terms of distinct, identifiable constituents present in respective proportions in the composite image captured in the pixels.

Processor 302 is coupled optionally with statistical hypothesis testing in certain embodiments by which the set of signature components selected from the signature dictionary in terms of which to express the pixel vectors is evaluated and adjusted, if necessary. Alternatively, processor 302 may be configured to execute a more general version of the GAD type operation (such as described below) upon grouped pixel vectors. As a point of clarification, the number of signatures detected at each pixel need not be the same (as is shown); and, the decomposition vectors need not be of similar length (as shown for convenience of illustration).

Generating a suitable dictionary 303 of spectral signatures specifically suited for the particular image being processed is an important aspect of the method and system disclosed herein. In order to predict or establish target spectra, pre-established lab measurements of materials may be referenced, or independently classified field measurement pixel data may be acquired for training. In the latter case, a practical challenge is to combine data from numerous "known" pixels to produce a representative spectrum that may be added to the signature dictionary. Also, illumination type and prevailing conditions (angles, texture, shadow, atmospheric, etc.) may affect the apparent measured spectrum; hence, it is preferable to record (or otherwise allow for) variants of spectra in the signature dictionary to accommodate variations likely to be seen in any given image.

Mechanisms and methods for discovering and extracting signatures in data are described in [1] and [2]. The set of methods are described collectively herein as Greedy Adaptive Discrimination ("GAD"). Below is a brief summary of the GAD processing disclosed in more detail in [1] and [2], aspects of which are incorporated in the embodiments disclosed herein.

GAD Summary

The main elements of the GAD approach include a "GAD engine," comprising a Simultaneous Sparse Approximator ("SSA"), a memory system for representing approximated signals termed for reference purposes a "structure book," and one or more discrimination functions that operate on the structure books. The SSA takes as input a plurality of signals and produces a structure book for each signal. The output of the SSA comprises one or more structure books selected or otherwise suitably processed as illustratively disclosed in [1] and [2]. A structure book describes a linear decomposition of the signal and comprises a list of coefficients and a corresponding list of atoms for the decomposition. For example, each $j^{th}$ signal $f^j(t)$ in the plurality of input signals may be expressed as:

$$f^j(t)=a^j_0 g^j_0(t)+a^j_1 g^j_1(t)+ \ldots +a^j_n g^j_n(t)+R^j,$$

where $a^j_i$ represent the coefficients and $g^j_i(t)$ represent the atoms, or prototype-signals of the decomposition, and $R^j$ represents the residual error (if any) after n+1 terms. If $R^j=0$ then the representation is exact, otherwise the decomposition is an approximation of $f^j(t)$. A particularly advantageous feature of GAD is that, for a group of signals, the atoms at the $i^{th}$ step $g^j_i$ are constrained to be either identical or closely similar, thus facilitating direct and highly efficient comparisons and processing between signals so represented. The term "simultaneous" in "Simultaneous Sparse Approximator" refers to this property and distinguishes SSA from ordinary sparse approximations such as Matching Pursuits which operate on only one signal. The term "sparse" refers to the property of requiring only a small number of elements $g^j_i$ to well approximate any signal $f^j(t)$. Achieving a simultaneous approximation of a group of signals that is also sparse is the goal of SSA processing. The typical result is a compact description of joint information extracted from a groups of signals.

One way to write the structure book is as a set of ordered pairs, $(a_i, g_i(t))$; however, the atom $g_i(t)$ itself need not be recorded. Descriptive information stored in the structure book may comprise the atom itself, a coded reference to the atom, or one or more parameters that uniquely define the atom (providing benefits such as memory efficiency, speed, and convenience of accessing the atom and/or its properties). The atoms $g_i(t)$ belong to a predetermined dictionary D of prototype signal elements, and are each preferably expressed in the exemplary embodiment as a function of scale, position, modulation, and phase parametric elements $(s^i_n, u^i_n, \xi^i_n, \phi^i_n)$ obtained from the dictionary D.

The dictionary D is preferably established as an intrinsic element of the SSA. In certain SSA implementations, the dictionary D may be implicit rather than a distinct separable component. In general, structure books are created relative to a dictionary D, and subsequent operations are performed based on this implicit relationship. A structure book may be recast into another representation by suitable mathematical projection operations known to those skilled in the art, in which case the elements $g_i(t)$ and the coefficients $a_i$ used in the structure book may change. In some cases, these new elements at) may belong to the original dictionary D, in other cases a new dictionary may be used.

The SSA produces structure books for each signal in the input collection of signals, such that the atoms of any structure book may be compared directly to those of any other. In the simplest case, the atoms may be identical for all signals in the collection. However, GAD SSA, as described in [1] and [2], is also able to produce atoms that are "similar" as judged by the given processing rather than identical. This feature is advantageous in many implementations because it allows the processing to automatically account for noise, jitter, and measurement error between the signals. In the case of spectral processing, this ability to compensate for natural variations has many applications: noise and measurement errors arise in acquisition, while shifts and variations between pixels containing similar materials also arise due to changes in lighting conditions, local shadows, material aging, material property variations, etc. Thus, it is highly unlikely that one will repeatedly measure identical spectral reflection from any given object outside of laboratory conditions.

Processes that produce similar simultaneous approximations for a group of signals may be substituted for GAD SSA with appropriate adjustments. The atoms selected will vary depending upon the SSA implementation. Furthermore, the output of any such SSA may be further processed (e.g., to orthogonalize the atoms in the structure books) without departing from the spirit and scope of the present invention.

Generally, a GAD SSA permits the range of "similarity" between atoms across structure books to be controlled. The ranges may be fixed in advance for each parameter, or may be adapted dynamically. GAD associates similar-though-not-identical atoms in an automatic fashion. Numerous schemes for constraining variation will fall within the general mechanism.

A detail of the SSA implementation is the dictionary from which atoms may be selected. For illustrative purposes, certain embodiments utilize a Gabor dictionary such as referenced in [1] and [2], which comprises modulated, translated, and scaled Gaussians, combined with Fourier and Dirac delta bases. This exemplary dictionary does not limit the scope of the present invention, and other reasonable collections of prototype signals may be substituted, including in certain embodiments a dictionary of random prototype signals. In other embodiments, the dictionary may be orthogonal, such as one having a Fourier basis, or not. It may be redundant, such as one having a collection of wavelet packet bases. It may also be highly redundant, as is the Gabor dictionary. Certain advantages of speed may be realized with sparser dictionaries; however, redundancy tends to increase the SSA's ability to generate a sparse approximation that does not oversimplify.

Specific to the application of multi- and hyper-spectral processing, one may use dictionaries developed from laboratory signatures, as described elsewhere in this specification. These may be stored as vectors, decomposed into common components, or parameterized and generated as needed from functions. However, in certain embodiments directed toward discovering signatures from collections of data, a dictionary that is not well correlated with the targets (such as the general function spaces or random dictionaries mentioned above) exhibits the advantage of avoiding bias in finding commonalities among examples.

Each $f^i(t)$ will typically be measured discretely in any digital system; however, in spectral estimates as with other signal processing each $f^i(t)$ may be considered to be an discrete sampling of a continuous function. $g_i(t)$ may likewise be a continuous functions where, in some embodiments, each is parametrically described within the dictionary. $g_i(t)$ in other embodiments will be discrete vectors of finite length.

Generally, to apply these GAD methods in accordance with certain aspects of the present invention, a collection of pixels known to contain the same material are preferably grouped. A joint sparse approximation is executed thereon to find a sparse working space in which to compare and analyze the resulting signatures. By manipulating this space using described techniques, application of the GAD methods in accordance with the present invention produces a description of spectral commonalities amongst pixels belonging to the group, which comprises a spectral signature. This spectral signature is preferably further refined by applying the processes described herein to compare the spectral commonalities to typical spectra found in either background noise or in a separately selected and grouped set of likely false-positive confusion pixels for comparison. The refined signature produced by GAD will then include, in a typical embodiment, only those elements that are common to a true-positive group and not generally present in the comparison or background group.

Forming a "group" herein—as described in [1] and [2]—refers generally to taking any set of pixels together as a set for purposes of processing. Grouped pixels need not be contiguous with each other in the (x, y) spatial dimension. That is, pixels in a processing group may or may not be spatially grouped; it is only necessary that they be assigned (by any suitable means) and treated as such as part of the same processing set (i.e. "group").

Depending on the particular application intended, however, there may be advantages offered by maintaining spatial continuity between grouped pixels. As described in connection with an alternate embodiment of the present invention herein, spatial regions—rather than individual pixels—may be marked by any suitable means known in the art. Some examples of known marking measures include: marking regions by drawing a boundary around them; auto-separating regions by any of a host of vector classification methods (e.g., see list in HYPERCUBE, a known software package produced by Army ACE Topographic Engineer Center); applying any of a host of well-known published edge-detection methods (Canny, Harris, etc.) to define boundaries of regions that partition the (x, y) plane; and, auto-expanding from a sample pixel or a group of pixels to increase the marked set to reasonably similar pixels (e.g. see functions used in area selection or expansion in Adobe Photoshop and similar). Additionally, domain based knowledge may be applied to determine the shapes of pixel area boundaries, for example: discovering straight lines and corner boundaries in urban landscapes or where manmade structures are present; using farming patterns, known vegetation growth, or water-body shape patterns.

Known marking measures further include applying joint information from other modalities to help define boundaries, such as using elevation data (e.g. LIDAR) to determine that a tree is distinct from the ground cover, or that a building is distinct from a street. It is also within contemplation to make the results of the GAD process for use in grouping similar pixels within an iterative, bootstrapping type approach.

Figure 4A:
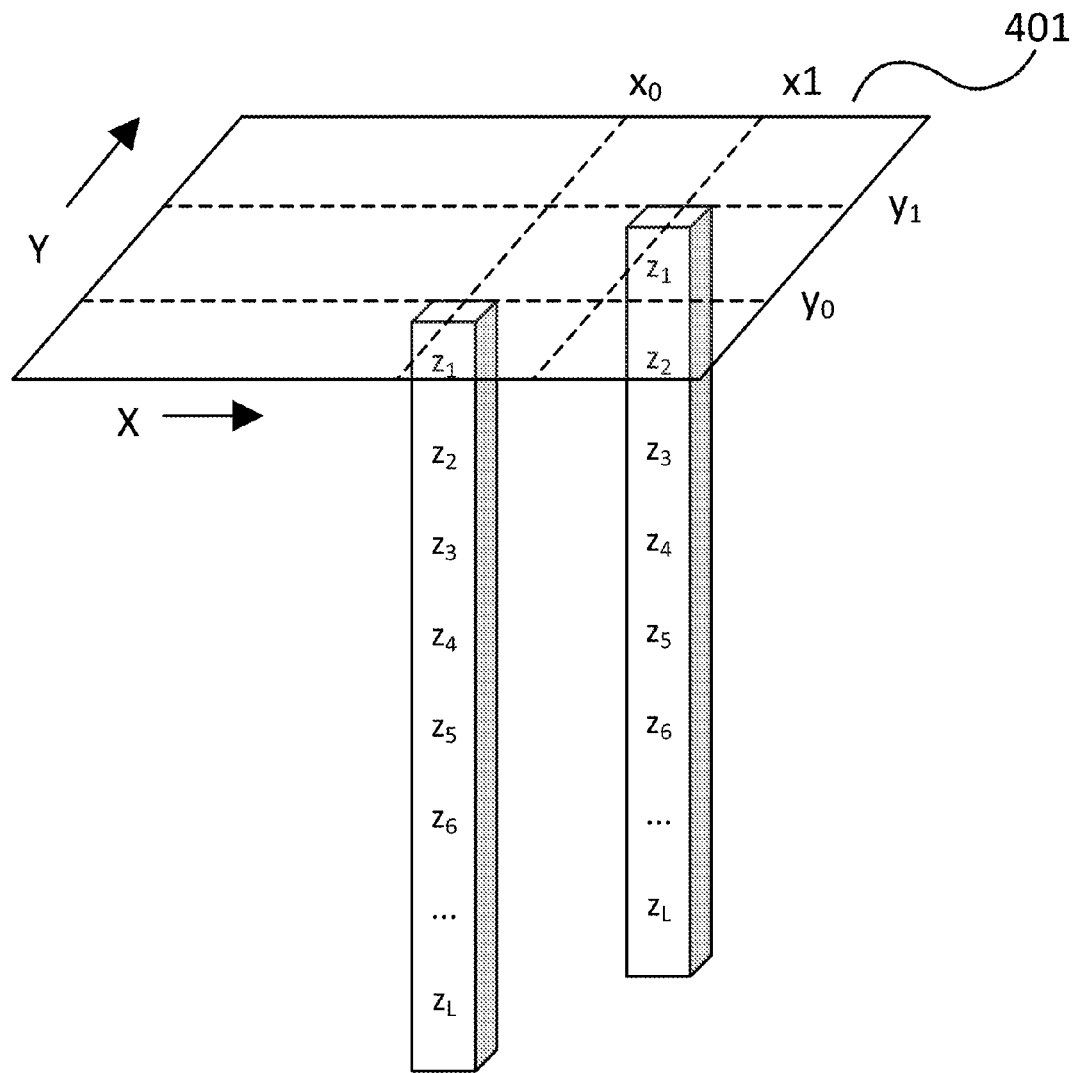
FIG. 4A is schematic diagram illustratively representing multiple pixels of image data having complex spectral content within a spatial image plane of pixels.
Figure 4B:
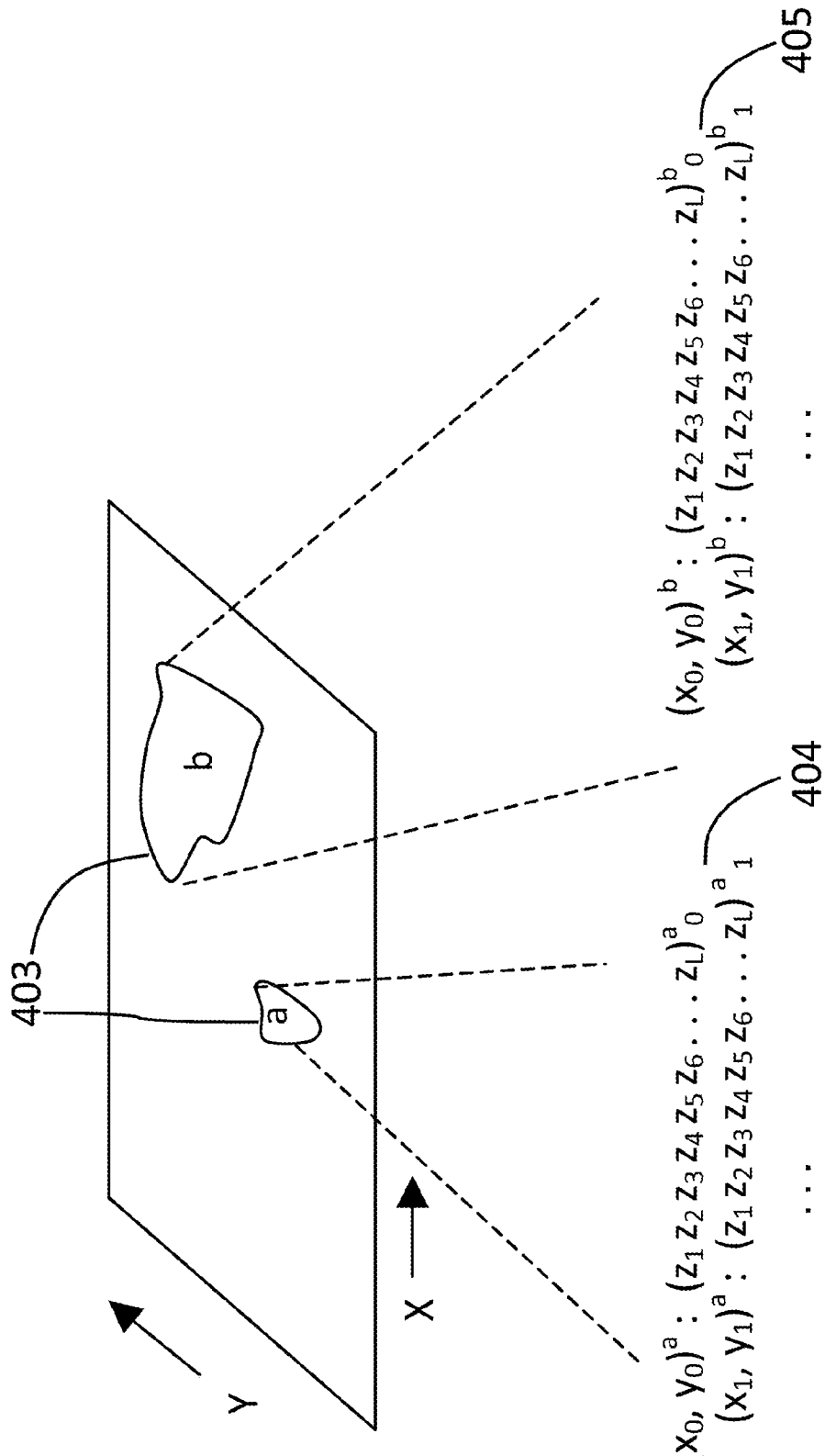
FIG. 4B is schematic diagram illustratively representing multiple grouped regions of contiguous of image pixels having complex spectral content within a spatial image plane of pixels.

FIGS. 4A-4B illustrate the distinction in point selection methods, both (or a combination) of which may be applicable in different specific instances. An image plane 401 is divided into an array of pixels. In FIG. 4A, two pixels are illustrated with their corresponding extracted spectral vectors 402. Any number of additional pixels may be combined therewith to form a processing group. The combined pixels may be listed in any arbitrary order, may be chosen from anywhere in the (x, y) plane 401, and need not have any specific spatial relationship.

FIG. 4B illustrates an alternative grouping approach, whereby instead of selecting individual pixels without spatial correlation, connected sets of pixels within delineated regions 403 are selected for processing and listed to form groups for analysis. Each of the regions a and b generates a list of component pixels 404 and 405, along with respective extracted spectral vectors for each. Each of the resulting groups of pixels may then be treated in processing either jointly with, or independent of, the other group, as necessary. Thus, local spatial characteristics are preserved on the scale of each group boundary size when extracting local signature spectra.

Where such bounded regions are formed, a system implemented in accordance with an exemplary embodiment of the present invention then processes each contiguous bounded group of pixels in a GAD or other sparse decomposition process to extract suitable signatures. Multiple bounded regions known to be similar may be further grouped, in order to discover information about any spectral signature elements commonly occurring in all of them.

An important advantage to maintaining the continuity of the groups is that local artifacts and unknown variations (if any) between different spatial parts of the (x, y) image plane add to the information available to aid discrimination (further dimensions of knowledge to be considered and accounted for). For example, if grass is known to be present in two different regions of the image, but in one case it is exposed to bright sunlight while in the other encompassed by a shadow, then the combined groups may be processed to analyze and determine: (a) spectral elements common to both illuminations, (b) spectral element differences between the two regions, and (c) spectral elements common within one region but not present in the other. The additional information often provides a powerful additional tool for extracting multiple discriminatory signatures for the same material in automated fashion.

Thus, by mapping a hyper-spectral data cube to lists of grouped vectors—whether the grouping is by associating pixels arbitrarily, or it is by associating pixels in a manner that preserves spatial connective information—the full array of GAD techniques described in [1] and [2] may be applied. As discussed in those references, the simultaneous sparse processing of multiple similar data vectors generally yields extremely rapid discovery of and convergence to a common underlying structure. These methods generally tend to be much faster than typical iterative dictionary learning methods that might otherwise be applied.

Figure 8A:
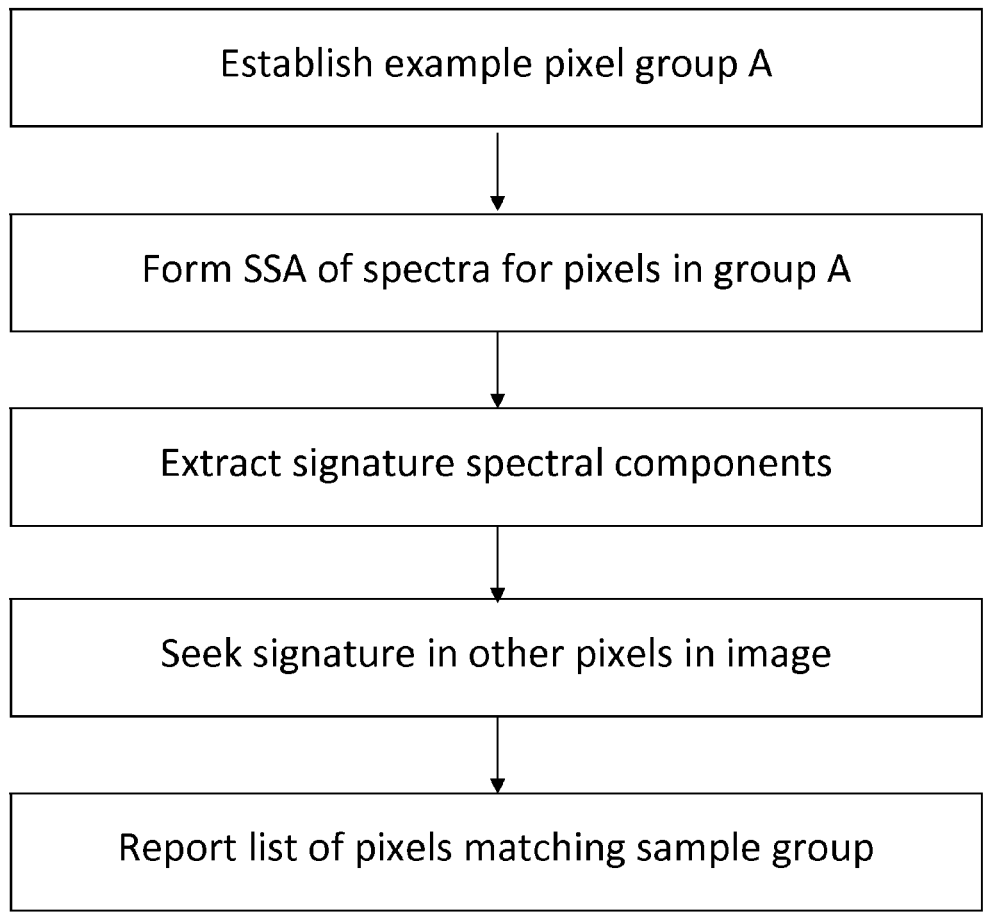
FIGS. 8A-8B are flow diagrams illustrating flows of processes with different examples of pixel groupings in different examples of processing according to alternative embodiments of the present invention.
Figure 8B:
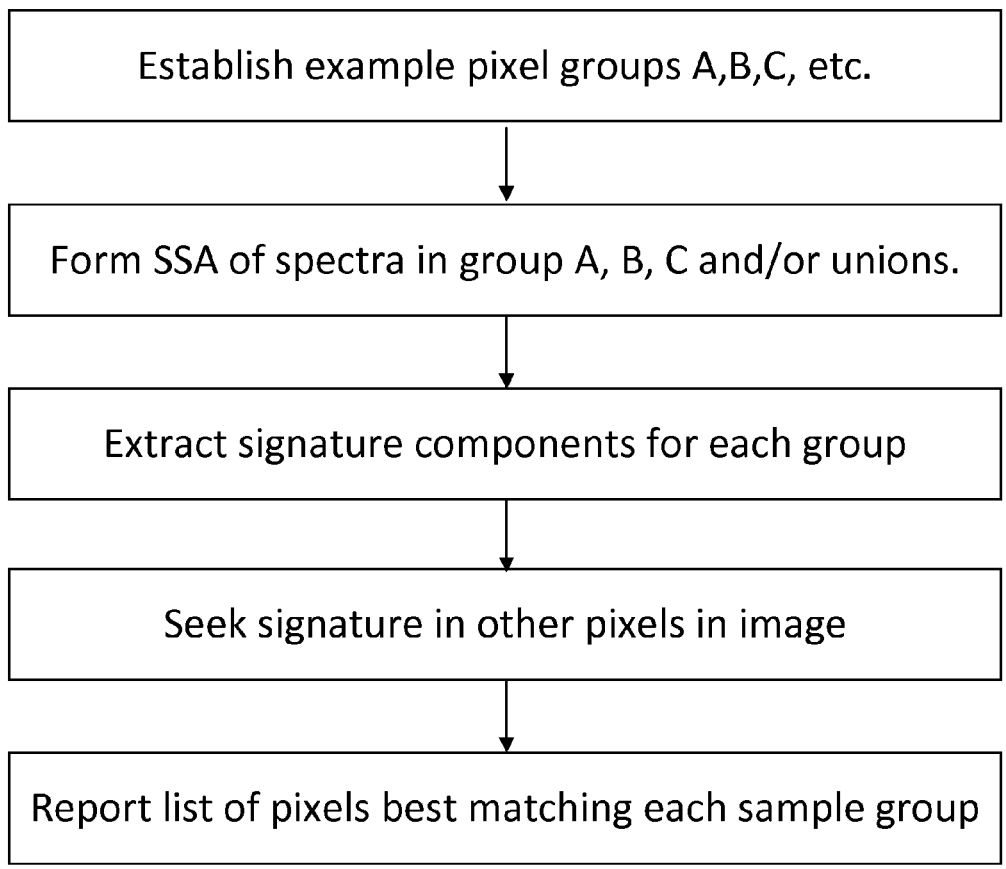

Exemplary flows of processes with different examples of pixel groupings are illustrated in FIGS. 8A-8B. FIG. 8A illustrates one example of spatial groupings for finding similar materials in an image. An example group A of pixels is established. GAD (or other) SSA is performed on the set of grouped pixel spectra to produce a joint set of sparse approximations, which is subsequently reduced to one or more "typical" signatures representative of the group A by examination of the emergent information. (Exemplary details of this reduction are elaborated in [1] and [2]). The remainder of the image is examined, pixel by pixel to determine which other pixels are sufficiently similar to the established set of signatures, and a list of matching pixels is reported as having similar properties to the example group. This process may be employed in certain implementations of FIGS. 2 and 3 in generating and then applying a signature dictionary corresponding the discriminating components necessary to separate pixels of type A from others. The process may, in certain embodiments, generate a dictionary of only one signature. However, in other embodiments, multiple signatures may be formed due to natural variances in the group A into sub classes. Also, as set forth in [1] and [2], the recorded description of this signature may include information about typical occurrences of certain background spectral features in all pixels in the data.

FIG. 8B illustrates a similar flow of processes for multiple example groups. In this case, signatures are established for each example group, and the best match at each pixel is established and reported, thus classifying each remaining pixel into one of the example groups. As discussed in [1] and [2], depending on the goals of the classification, each group may be examined individually, or collectively by executing a joint SSA and subsequently deriving common and difference signature elements between and among groups to aid in the classification process at hand. Once signature information is extracted by a GAD SSA, the classifier may operate in a host of ways. In one exemplary embodiment, a decision space is established based on the degree to which each signature component matches each pixel, and a hyper-plane is defined which separates each group from the next. Other possible approaches are detailed in [1] and [2].

With reference to the example illustrated in FIG. 8B, signatures for individual groups A, B, C, etc. are examined. Questions of overlap or exclusion may also be examined, for example, by seeking to define a signature for pixels that include material from both groups A and B in some ratio. Likewise, pixels might be sought that contain material from group A but not from group B. Using GAD methods, after extracting signatures, these signatures may be post-processed and the classification space adjusted accordingly.

Figure 9A:
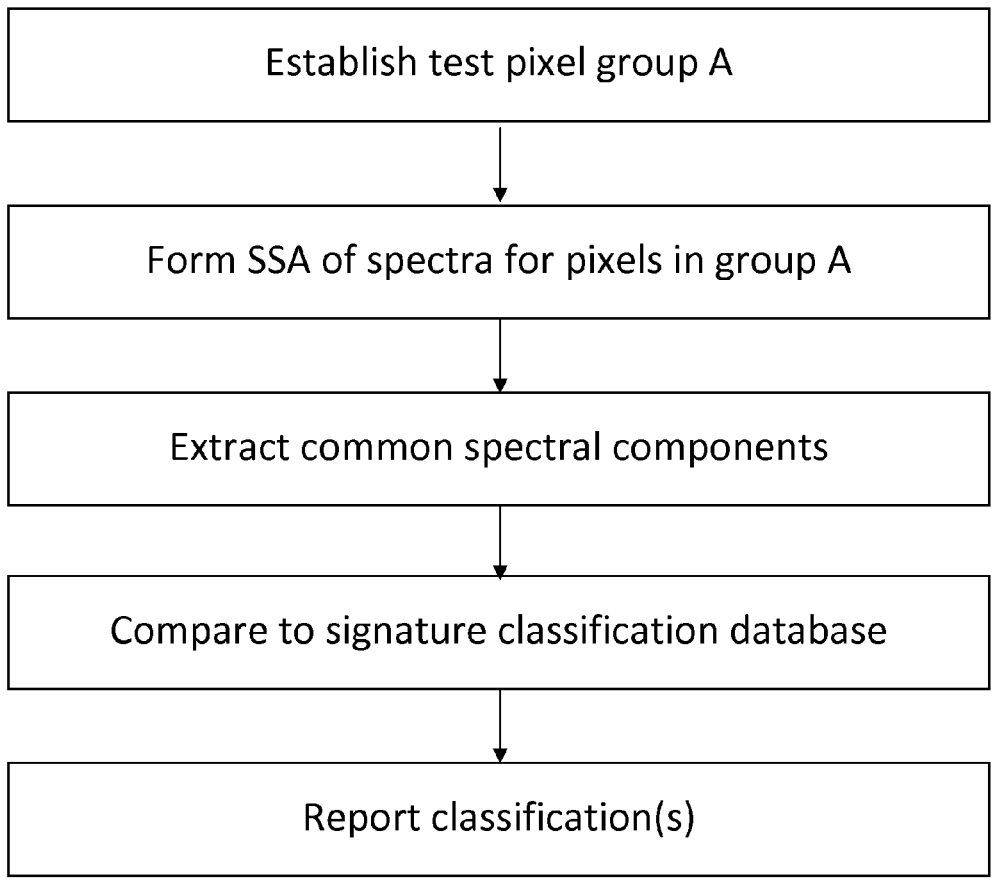
FIGS. 9A-9B are flow diagrams illustrating flows of processes with different examples of spatial pixel groupings jointly processed in different examples of processing according to alternative embodiments of the present invention.

Spatial grouping may, in certain embodiments, also be used in applying the spectral signature dictionary to discover joint information in sets of pixels. FIG. 9A illustrates one exemplary flow of processes in this regard. A local test group A of unknown pixels to be evaluated is established. The group A may be established, as already discussed with reference to FIG. 4, by grouping a pixel with its surrounding neighbors, by detecting natural boundaries by a computational process, by drawing a region, by automatically associating physically separate pixels, and so forth. This selected group is then jointly processed by SSA with respect to a dictionary D and reduced to a set of common spectral components. The effect of this co-processing is to emphasize spectral elements common to the group, thus providing a more robust and stable example of the underlying materials than any one pixel would typically provide alone. The resulting emergent common elements may then be compared to a classification database to provide a robust classification of the entire group of pixels.

Spatial grouping as disclosed herein provides additional benefits in artifact reduction. It is not uncommon in hyperspectral data acquisition to introduce spatial pixel shifts in portions of spectral bands. Co-processing a point with its surrounding neighbors by means of SSA, rather than relying on each pixel individually, tends to minimize the detrimental impact of such disparities on classification.

The selection of groupings (spatial or non-spatial) illustrated in FIG. 4 may, in different embodiments, be applied both at the stage of finding signature material, as well as at the stage of finding pixels and image regions that match known signatures. Also, the processes involved in finding a signature dictionary may, in different applications of the invention, occur during processing of a multi-spectral image with the goal of determining related regions within that image, or in advance of image analysis by reduction of sets of training data to a dictionary for later application to new acquisitions. As illustrated in FIG. 8B, the SSA processing of pixel groups to signatures may effectively result in both signature discovery and area classification occurring in the same overlapping process.

Figure 9B:
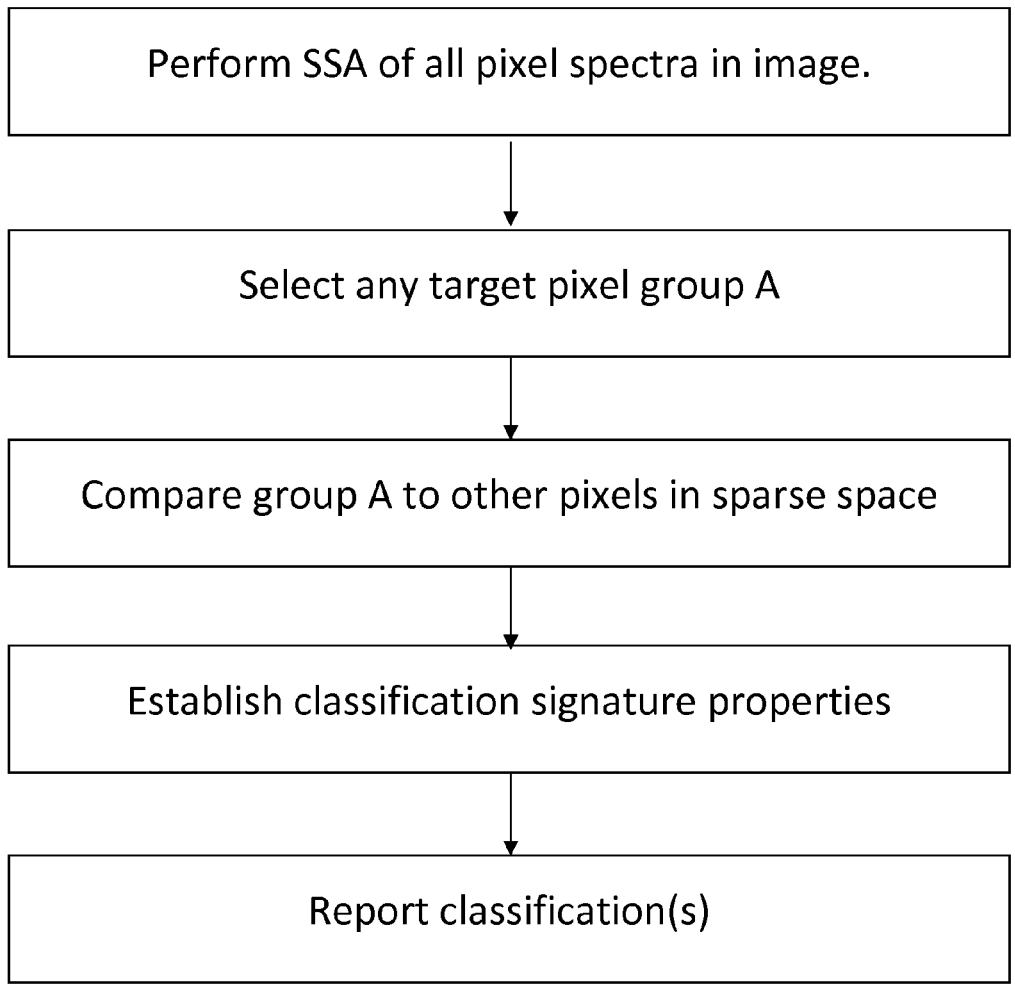

The example of FIG. 9B operates collectively upon all pixels of potential interest employing the GAD methods taught in [1] and [2]. All pixels of potential interest, up to and including an entire data cube, are jointly processed by SSA to re-represent them in terms of a small space of common spectral signature components. One or more target groups are selected, either a priori, as described previously or by an automatic clustering process which seeks similar sub-groups in the new representation space. By seeking to select those spectral component elements that minimize within group variance and maximize between group separations, the system establishes a preferred subset of components on which to distinguish one group from any other, or any one group from the whole of the remainder. Thus, classification is defined within the joint sparse representation space, signature properties may be recorded, and classification may be performed on any or all pixels without returning to the original spectral space. In an operational mode where one image is being analyzed exhaustively, this example of system operation provides a significant advantage over others that involve repeated SSA operations on different subsets. The analysis dictionary for SSA in this case may be either a general purpose dictionary as defined above, or a previously established signature dictionary.

The focus in preceding paragraphs has been on the process of developing a specific (or learned) dictionary of discovered spectral signature elements (based upon a general dictionary as described, for example, in [1] and [2]). This spectral signature dictionary may then be used for detection of particular images, identifying spectra in pixels during new acquisitions, or to identify similar spectra in the same acquisition.

While the spectral signature dictionary is created initially starting with a general dictionary (of known spectral components which may or may not individually have a particular high correlation to any imaged features captured in the pixel data), the spectral-signature dictionary is produced in accordance with the present invention to include a list of signatures corresponding either to a known set of specific features or material classes applicable to a given image, or to an emergent set of classes applicable thereto.

The resulting dictionary signatures are preferably described in terms of structure book entries established relative to the general dictionary. They may (according to GAD in [1] and [2]) be stored either with respect to indexing by those components of the general dictionary or may be mapped back into complete data vectors in the original observed spectral domain. The latter approach creates direct signature patterns as vectors stored in memory that are easily understood by a human operator and may be used in a matched filter type detector. The former approach of indexing to elements of the general dictionary provides additional flexibility in signature detection, and is further described below.

In accordance with certain aspects of the present invention, decomposition of the given pixel image data is generally carried out at two levels. Ultimately, it is carried out at the image detection level, where a Matching Pursuits, GAD SSA or other suitable type of decomposition process is carried out with reference to a dictionary having a comparatively short list of spectral signature dictionary elements, so as to estimate the pixel data in terms of proportional contributions (linear combinations) of a few underlying spectra. At this level of decomposition, a relatively few signature spectra are eventually discovered in each pixel, typically, such that the decomposition process tends to be short, although any individual spectral components S1, S2, etc. (FIG. 3) may be a relatively complex vector. Decomposition is also carried out at a lower level, by which the underlying spectra are initially found in order to create the spectral signature dictionary in the first place. At this lower level of decomposition—where a general dictionary is initially referenced, and a GAD or other simultaneous sparse approximation method (see [1], [2]) is preferably employed—the decomposition process tends to be more involved, producing much longer lists of general dictionary elements. Those general dictionary elements, when taken in combination, produce only a comparatively few signatures to be stored in the spectral signature dictionary that is generated.

The different levels of decomposition are distinguished further below. Matching Pursuits processes, as known in the art, treat only one signal at a time in producing its sparse approximation. On the other hand, simultaneous sparse decomposition processes, such as introduced with GAD in [1], treat either one or many signals (jointly and simultaneously) to form a sparse representation therefor in a common space. Thus, GAD processes are preferable to analyzing collections of pixel spectra taken together because they are not limited to examining just one measured pixel spectrum at a time.

In accordance with an exemplary embodiment of the present invention, therefore, a method and system are provided for processing, analyzing, and comparing image pixel data for representation in terms of certain distinguishable constituents of what is actually imaged. The process preferably begins with discovery of underlying spectral components representative of the distinctly distinguishable image constituents. A simultaneous sparse approximation is preferably performed on groups of image pixel data in this regard, and, if necessary, one or more parametric "mean" representations are generated for certain pixel groups. The parametric mean representations that may be derived (see [1] [2]) each include a collection of time-frequency atoms (from a known general dictionary) to represent a "typical" image signature typifying a particular pixel group.

The parametric mean representations may, in some embodiments, be compared to each other in order to further reduce the dimensionality of the resulting signatures. For example, only the most discriminating spectral components—or those that most strongly distinguish between groups—may be kept, while other less discriminating components (such as those common to multiple groups) may be discarded. In certain embodiments, the components may be diagonalized, orthogonalized, or otherwise processed in suitable manner to aid in this process. In any event, by flagging components that strongly distinguish between pixel groups, and/or by noting group-typical component values amongst multiple pixel groups, a highly discriminant set of image constituents may be obtained via the resulting spectral signatures.

A spectral signature dictionary is generated in this manner to include the discovered spectral signatures. This spectral signature dictionary is then referenced to decompose one or more individual image pixels for vector representation in terms of the spectral signature dictionary components. Among other things, the proportional compositions of the image constituents may be determined for the mixed, or composite, images captured in the pixels.

Referring now to FIG. 2, such schematically illustrates the initial processing upon a group of image pixel data vectors 201 to discover the underlying signature spectra by which to populate a spectral signature dictionary, and in terms of which image pixel data may be represented. The image pixel data is received at an input unit "In" suitably configured to provide the requisite interfacing, buffering, and the like for the intended application. If the image pixel data is not already received in such form, it is preferably formulated as pixel vectors defined by their respective multi- or hyper-spectral components, much as illustrated in FIGS. 1A-1B.

The spectral signature eventually discovered for each group is represented by one or more vectors of parametric components 204, or as one or more linear combinations of components $S_a$, $S_b$, etc. Each component $S_a$, $S_b$, etc. represents a spectral component comprising either a description in terms of component atoms from the general dictionary 203 (i.e., a structure book per [1] [2]) or, optionally, a reconstruction of the parametric mean spectral signature for the group. Processing 202 preferably implements simultaneous sparse approximation according to the GAD processes disclosed in [1] and [2], coupled optionally with statistical hypothesis testing as described above. The processing is carried out with respect to a general dictionary 203 that may comprise any suitable set of known prototype functional elements (i.e. atoms) for use in describing pertinent signal spectra in the intended application. In a preferred embodiment, a parameterized dictionary such as described in [1] and [2] is referenced, facilitating parametric mean formulations of common signature elements of a given pixel group. The so-called Gabor dictionary used as an example in [1] and [2] may be readily extended to include various local and non-local patterns for compactly describing particular spectral elements of interest.

Figure 5:
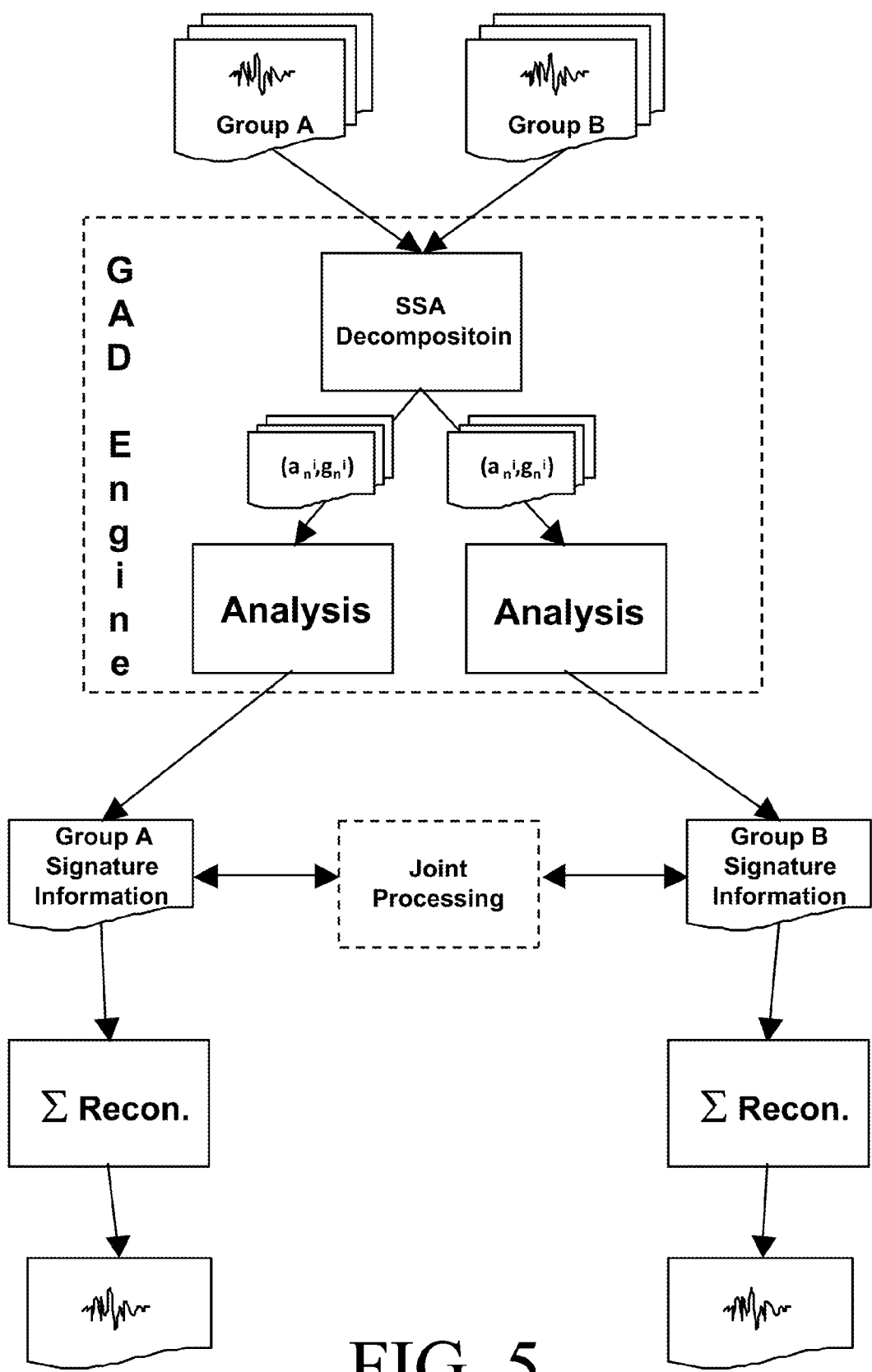
FIG. 5 is flow diagram schematically illustrating a flow of processes within a simultaneous sparse approximation process executed in an exemplary embodiment of the present invention.

For each group of pixel data, a signature (or set of signatures) 204 is produced and added to the spectral signature dictionary 205 for use in subsequent detection and decomposition of pixels in terms of candidate spectral signatures, as described in connection with FIG. 3 below. FIG. 5 Illustrates a general GAD processing engine as described in [1] and [2]. Use of spatial groupings as there shown (with GAD and the simultaneous sparse approximation processes described in [1] or others as considered in [2]) provides considerable processing advantages, and may be embodied to create a significant improvement in the detection stage as well as in the signature discovery stage.

Initially, similar pixel spectral vector groupings are formed as described in preceding paragraphs. The given pixels may be grouped in spatially contiguous or non-contiguous manner, although in certain applications spatially contiguous groupings may offer advantages as described above. The groupings shown refer generally to both spatial and non-spatial groupings. Unlike the Matching Pursuits or other known signal decomposition processes, the approach illustrated in FIG. 5 groups a plurality of pixels for grouped comparison against an established signature dictionary. The manner of grouping is not salient in this regard. Information from a list or group of pixel vectors (i.e. for multiple pixels) is considered jointly rather than individually and independently for each pixel vector.

Consequently, Matching Pursuits is not applicable in the process illustrated in FIG. 5, since more than one pixel is being processed at once via Groups A and B. The GAD techniques disclosed in [1] and [2] are accordingly applied to simultaneously and jointly analyze collections of pixels to determine a common underlying measured signature. Preferably, this is carried out on a computer platform in programmably configured processing with respect to the previously generated signature dictionary, to provide a multi-sample estimate of the combinational mixing parameters. For example, if the analysis is selectively limited to only three possible underlying spectral components in each pixel mix, then the measured spectra for the given pixels are determined to be:

$$f_{x1,y1} = a_{x1,y1} S1 + b_{x1,y1} S2 + c_{x1,y1} S3 + R_{x1,y1}$$

$$f_{x2,y2} = a_{x2,y2} S1 + b_{x2,y2} S2 + c_{x2,y2} S3 + R_{x2,y2}$$

$$f_{x3,y3} = a_{x3,y3} S1 + b_{x3,y3} S2 + c_{x3,y3} S3 + R_{x3,y3}$$

etc.

where $f_{x,y}$ for each arbitrarily numbered pixel 1, 2, 3, etc. represent the measured spectra at pixel points $(x_1,y_1)$, $(x_2,y_2)$, $(x_3,y_3)$, etc.; the vectors S1, S2, etc. represent signature dictionary spectra elements; and, R represents the residual error for each particular pixel. As before, each coefficient a, b, c, etc. represents the proportional contribution of each dictionary element to the spectral signature f measured at each specific pixel point.

This is a simple example showing only three possible underlying spectral components S1, etc. In general, any number of spectral components may be determined in accordance with the methods [1], [2], from zero (if no acceptable matches are found) to a decomposition that includes every spectral element in the signature dictionary. The magnitude of the residue R in comparison to the measured pixel vector f, is one measure of the degree to which a given decomposition acutely fits the observed data. The lower the residual value R, the better the fit. The size of the coefficients a, b, etc. is also indicative of how well the decomposition fits the observed data.

The GAD process as described [1] and [2] has the further significant advantage of permitting S1, S2, etc. to vary somewhat in each pixel, and thereby automatically compensating for small local variations, effects of artifact and lighting changes, variations in sensors and equipment, and so forth. Thus, the measured spectra for the given pixels are determined more accurately to be:

$$f_{x1,y1} = a_{x1,y1} S1 + b_{x1,y1} S2 + c_{x1,y1} S3 + R_{x1,y1}$$

$$f_{x2,y2} = a_{x2,y2} S1 + b_{x2,y2} S2 + c_{x2,y2} S3 + R_{x2,y2}$$

$$f_{x3,y3} = a_{x3,y3} S1 + b_{x3,y3} S2 + c_{x3,y3} S3 + R_{x3,y3}$$

etc.

where, $S1_{x1,y1}$, $S1_{x2,y2}$ and $S1_{x3,y3}$ are similar but not (necessarily) identical S1; $S2_{x1,y1}$, $S2_{x2,y2}$ and $S2_{x3,y3}$ are similar but not (necessarily) identical S2; and, $S2_{x1,y1}$, $S2_{x2,y2}$ and $S2_{x3,y3}$ are similar but not (necessarily) identical S3. They form an equivalence class of similar but not necessarily identical matched spectra in which pixels are decomposed. Equivalence classes may also be defined between multiple spectra, for example, declaring some spectra S1 to be equivalent to some other spectra, say S10 or S47, for purposes of comparison if these are known to represent the same material imaged under different lighting conditions, different angles illumination, etc.

Two modes of comparison are afforded by the simultaneous decomposition. First, to use the above example, one may simply consider the each set of a, b, c (and any additional) coefficients as samples (in a statistical sense) of the underlying spectra. Thus, for each column of the decomposition above (i.e., each vertical set of coefficients a), the hypotheses that the group of pixels is consistent with the target underlying spectra can be tested by well-known statistical means. For example, as written above, $a_{x1,y1}$, $a_{x2,y2}$, $a_{x3,y3}$, etc. represent a set of sampled coefficient values for the spectra S1, and so forth for S2, etc.

A second mode of comparison is realized by application of a GAD process with respect to equivalence classes of signature dictionary spectral elements. Using techniques described in [1] and [2], a parametric mean may also be formed to arrive at a representative decomposition for the entire group of pixels. In other words, a common signature may be extracted from the group of pixels in the new data set, such that the newly extracted common signature may be compared directly with previously stored spectral signatures. This has the advantage that similarity in multiple parameters may be tested. It provides considerable improvement over requiring target spectra to be near identical to the signatures in all aspects but magnitude to be comparable, and thereby enables more variation to be accounted for without additional work.

If the discovered signatures are stored in a form that maintains the parametric structure of a more general dictionary (e.g. Gabor etc., as per [1]), then a great deal of flexibility is found in defining similarity, and in statistically testing the similarity of spectra in the new image pixels and in the established signature dictionary. For example, S1, S2, etc. as referenced above may be stored simply as vectors of spectral amplitude measurements in one embodiment of the spectral signature dictionary. In another embodiment, however, each may be stored as a structure book of general parameterized elements, such as:

$$S1 = k_1 G_1 + k_2 G_2 + k_3 G_3 + \ldots k_n G_n$$

where each $k_i$ is a coefficient value, and each $G_i$ is a general dictionary element selected from a previous analysis, which element may be parameterized by multiple continuously varied parameters to create an infinite general dictionary of choices. By substitution, then (for example):

$$f_{x1,y1} = a_{x1,y1} S1_{x1,y1} + b_{x1,y1} S2_{x1,y1} + c_{x1,y1} S3_{x1,y1} + R_{x1,y1} = a_{x1,y1}(k_1 G_1 + k_2 G_2 + k_3 G_3 + \ldots k_n G_n) + b_{x1,y1}(\ldots) + \ldots$$

Thus, comparisons may be made not only of the amplitude of the coefficients but also of the parameters defining each dictionary element $G_1$, $G_2$, etc.

Referring back to FIG. 3, a processing of pixel data vectors 301 is generally illustrated in accordance with an exemplary embodiment of the present invention, to recover pixel decompositions in terms of candidate signature spectra, as represented by corresponding vectors of coefficients 304. Processing 302 is accomplished as described with GAD operations disclosed in [1] and [2] coupled optionally with statistical hypothesis testing as described above. Note again that the number of signatures detected at each pixel need not be the same, and that decomposition vectors of similar length are simply shown for convenience of illustration.

As shown, each input spatial data point (image pixel) 301, expressed by its associated vector of spectral data, is mapped to a specific decomposition 304 expressed in terms of likely candidate component spectral signatures from the discovered dictionary. Such decompositions 304 serve to estimate/predict the constituents of the pixel's image composition by predicting the component spectra which combine to form the measured pixel spectra.

As shown in FIGS. 6-9, the processes of signature discovery and subsequent detection, matching, or classification of image pixels may be closely combined in certain alternate embodiments. For example, in a given image, a first set of pixels may be designated (by selecting one pixel, by selecting a bounded, region, etc.). That designated first set of pixels would comprise a group of vectors that is then treated according to suitable methods in [1] and [2] to extract a common, underlying signature spectrum typifying the group. A set of multiple signatures may be extracted where it is determined (such as by methods in [1] [2] and a suitable cluster analysis approach) that no single signature spectrum well describes the entire set of pixel vector data. (A multiple spectra signature may result in any of the above GAD analyses as well.) The resulting signature or signatures may then be used to process the remaining pixels of the image—that is, those pixels outside the designated first group of sample pixels. Each individual pixel in the image may be compared to the extracted signature and classified as similar if it is determined to be sufficiently close based on the particular requirements of the intended application. Likewise, automatic (or manually) selected sub-regions of the image may be analyzed using simultaneous methods (e.g. GAD as described above) for classification as similar to or distinct from the originally selected pixels.

With respect to spatial processing, the grouping of pixel vectors for GAD or other simultaneous analysis may be accomplished at any scale, and in any overlapping or non-overlapping combination, to achieve the desired retention of spatial data. In the example illustrated in FIG. 4B, only two disconnected groups are extracted. In other applications, various other arrangements of regions may be defined. For example, one region may lie inside of another; one region may adjoin another; multiple regions may lie inside of or adjoin others; and, regions may span numerous pixels as shown, or may be as small as necessary, down to and including only one pixel. Thus, the single pixel approach illustrated in 4A is a logical subset of the spatial region approach illustrated in FIG. 4B. Such spatial-associative group selection is a broadly applicable approach.

Since both the processes of extracting signatures from multiple points to form a spectral signature dictionary signature set and detecting signatures from multiple pixel points in new data using the spectral signature dictionary set are similar operations under the described GAD type processing model, the following examples are set forth without regard to which stage of processing is to be undertaken. With suitable accommodation for the particular requirements of intended applications, the examples are applicable to either undertaking. Moreover, the many advantages, options, and details described above in association with any one processing step are generally applicable to the other.

One simple example of defining a grouped spatial region within another is where shadow or texture variations occur in the image. Take, for example, a given region c comprising an area of pavement outside a building and a region d comprising a sub-region of region c that includes only that portion of the pavement covered by the building's shadow. It is preferable to extract signature information for three classes of spectrum: pavement in sun, pavement in shade, and pavement in general. By forming the nested groupings, the simultaneous sparse approximation approach taken by GAD accomplishes discovery of signature information in all desired variations.

For a more generalized case, if imaged multiple material types all lie in one special region—using a shadow again for an example—then by comparing regions of each material inside the shadow as well as outside the shadow, not only may the difference in each material's spectral signature be discovered, but also the general characteristics of the shadowed illumination. This is accomplished by grouping the materials according to, and considering only, the differences between the shadowed and un-shadowed sub-groups. Such information provides a signature of the shadowed condition to be used in detection elsewhere to automatically discriminate and discover the effects of shadows. This process may also be used to predict the behavior of other materials that have only been analyzed in sunlight but may later be found in similar shadows.

Mixed material pixels may also be treated in this manner. For example, pavement may be grouped, with each pixel containing a tire mark sub-grouped, and each pixel containing a piece of litter sub-grouped, etc. Many other applications for nested, overlapping, adjoining, and disjoint processing groups will be obvious to those skilled in the art.

Figure 10A:
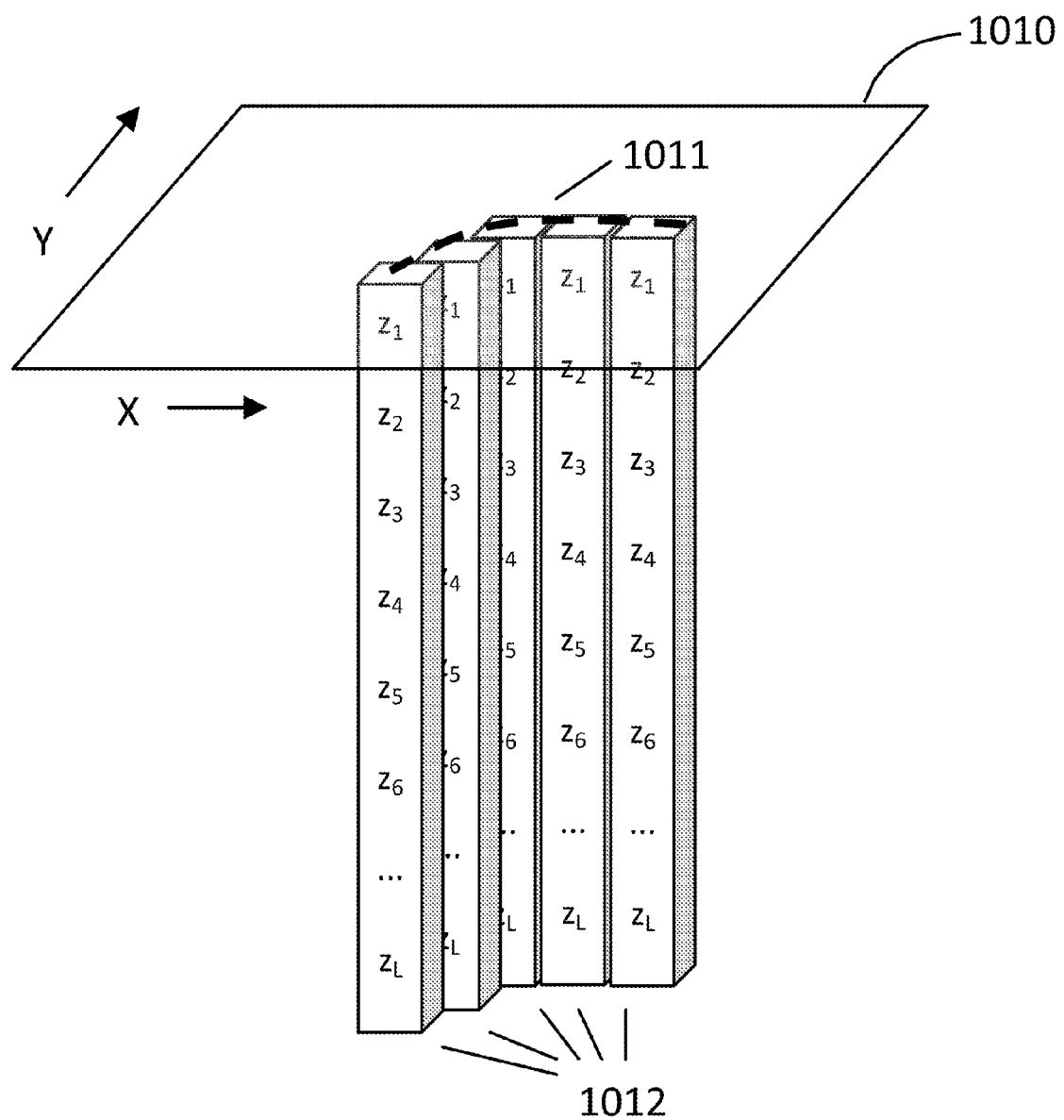
FIG. 10A is a schematic diagram illustratively representing multiple image data vectors of complex spectral content along a curve within a spatial image plane of pixels according to an exemplary embodiment of the present invention; and, FIG. 10B is a schematic diagram illustratively representing image vectors of complex spectral content defined within a data cube of pixels according to an exemplary embodiment of the present invention.

Finally, the GAD type methods may be applied in spatial dimensions as well. Consider, for example, that a particular material might have specific spectral shift characteristics in the regions where it moves from direct to indirect illumination—say where it is partially shaded by a mesh or tree—due to textural or other features of the material. In this case, one can define a region of transition, bounded spatially by full illumination on one end and shaded on the other, and group each one-pixel step in the transition. Thus, signature spectra and how they change when parameterized by illumination may be distinguished. Referring to FIG. 10A illustrates an example, where a collection of spectral component vectors 1012 lie along a line, or arbitrary curve 1011 within a gradient or transition of interest in the spatial plane 1010.

Figure 10B:
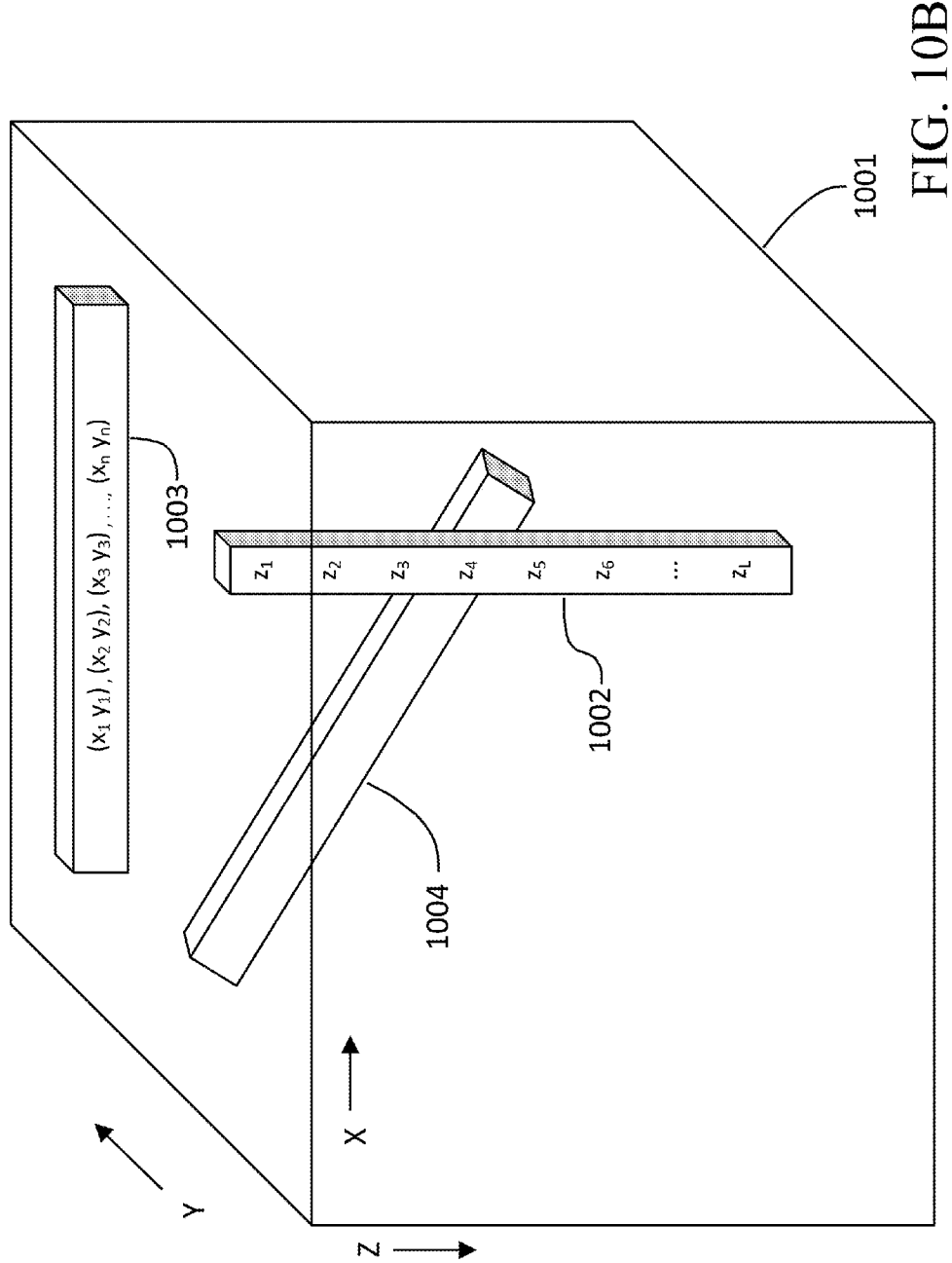

As will be apparent having understood the pixel vector approach, one may also consider data sets in the other dimension. That is, one may use defined connected spatial lines drawn arbitrarily through the data cube and extract one local vector for each spectral-spatial wavelength of interest. GAD will be equally useful in processing in the spatial dimension or in any other combination dimension taken through the cube. Referring for illustration to FIG. 10B, such data cube 1001 in the (x,y) plane is shown for example defining the spatial imaging extent, where the spectral bands, as before, are stacked along the z dimension. The illustrated sample vector 1002 is consistent with previous discussions in this disclosure. In addition to vector 1002, one may also examine a vector 1003, that spans a spatial (x,y) range at a fixed spectral plane of the cube. A series of spatially spanning vectors that align with a known physical target may, for example, be used to compare the spatial features of that target in different spectral imaging bands. This has application in determining edge or texture signature features. Vector 1004 illustrates for generality, an arbitrary vector band selected across both horizontal and vertical planes of the cube.

As described in [2], the GAD comparison methods remain applicable with a variety of specific decomposition (SSA) mechanisms and variations thereon, so long as they produce a simultaneously sparse approximation of the group of signal (e.g. spectral) vectors. The methods and system disclosed here make clear applicability in the context of spatial-spectral datasets sets such as multi- and hyper-spectral images.

These methods will have broad application apparent to those skilled in the art once they have understood the present disclosure. Upon reviewing the novel combinations of elements disclosed in the specification and figures and the teachings herein, it will be clear to those skilled in the art that there are many ways in which the subject invitation can be implemented and applied. The above description relates to the preferred modes and example embodiments of the invention.

The descriptions above are intended to illustrate possible implementations of the present invention and are not restrictive. The inventor contemplates variations and additional features and functions within the skill of the art, including advances in operational technology. Although the invention has been described in connection with specific forms and embodiments thereof, it will be appreciated that variations, modifications, and alternatives other than those discussed above may be resorted to without departing from the spirit or scope of the invention. Such variations, modifications, and alternatives will become apparent to the skilled artisan upon review of this disclosure. For example, equivalent elements may be substituted for those specifically shown and described. Certain features may be used independently of other features, various methods independently described may be combined, and in certain cases, particular locations of elements may be reversed or interposed, all without departing from the spirit or scope of the invention as defined in the appended claims. The scope of the invention should therefore be determined with reference to the description above and the appended claims, along with their full range of equivalents.

What is claimed is:

1. A system for processing electronically captured images formed by a plurality of spectral components comprising:
   a general dictionary having a plurality of reference components;
   a discovery processor coupled to said general dictionary, the discovery processor being programmably configured to execute a simultaneous sparse approximation process upon image data vectors of at least a portion of the captured image, the discovery processor further programmably configured to adaptively discover for the image data vectors a set of core spectral signatures defined in terms of reference components automatically selected from said general dictionary; and,
   a match processor programmably configured to selectively match at least one individual captured image data vector to at least a portion of said core spectral signature set to decompose said image data vector to a representation as a linear combination of the portion of said core spectral signature set;
   whereby constituent features of the captured image portion corresponding to said selectively matched core spectral signatures are discriminated according to said linear combination thereof.

2. The system as recited in claim 1, wherein the image data is captured to include multi- or hyper-spectral pixels; and, said simultaneous sparse approximation process is executed upon at least one selectively grouped set of image data vectors.

3. The system as recited in claim 2, wherein said simultaneous sparse approximation process is of a greedy adaptive decomposition (GAD) type, at least one set of selectively grouped image vectors being disposed in spatially contiguous manner with respect to a spatial image plane.

4. The system as recited in claim 3, wherein predetermined environmental factors when present in the captured image portion are parametrically discriminated by said simultaneous sparse approximation for discovering said core spectral signatures responsive thereto, said predetermined environmental factors including local artifacts and lighting variations between different portions of the spatial image plane.

5. The system as recited in claim 3, wherein said simultaneous sparse approximation process is executed jointly upon a plurality of said selectively grouped sets of image data vectors, a representative linear combination of said core spectral signatures being determined for each of said selectively grouped sets of image data vectors.

6. The system as recited in claim 3, further comprising a spectral signature dictionary maintained responsive to said discovery processing to store said core spectral signatures discovered thereby.

7. The system as recited in claim 3, wherein said match process includes: a matching pursuits decomposition to generate a linear combination of said core spectral signatures for an individual image data vector, and an adjustment of coefficients in said linear combination for statistical optimization thereof.

8. The system as recited in claim 3, wherein said match process includes a simultaneous sparse approximation to decompose respective ones of said grouped image data vectors to generate a linear combination of said core spectral signatures for at least one of said grouped image data vectors.

9. The system as recited in claim 8, wherein said match process further includes an adjustment of coefficients in said linear combination of said core spectral signatures for statistical optimization thereof.

10. A system for discriminating constituents of an image electronically captured with complex spectral content by automatic spectral signature extraction comprising:
    a general dictionary having a plurality of reference components;
    a discovery processor coupled to said general dictionary, the discovery processor being programmably configured to execute a simultaneous sparse approximation process upon a set of image data pixels for at least a portion of the captured image, the discovery processor further programmably configured to adaptively discover for the image data vectors a set of core spectral signatures defined in terms of reference components automatically selected from said general dictionary;
a spectral signature dictionary coupled to said discovery processor for storing said core spectral signatures discovered thereby; and,
a detection processor programmably configured to execute a decomposition process for decomposing individual captured image data pixels to a representation as a linear combination of said core spectral signatures;
whereby constituent features of the captured image portion corresponding to said linearly combined core spectral signatures are detected in the decomposed image data pixel.

11. The system as recited in claim 10, wherein the image data is captured to include multi- or hyper-spectral pixels; and, said simultaneous sparse approximation process is of a greedy adaptive decomposition (GAD) type executed upon at least one selectively grouped set of image pixels.

12. The system as recited in claim 11, wherein predetermined environmental factors when present in the captured image portion are parametrically discriminated by said simultaneous sparse approximation for discovering said core spectral signatures responsive thereto, said predetermined environmental factors including local artifacts and lighting variations between different portions of the spatial image plane.

13. The system as recited in claim 12, wherein said simultaneous sparse approximation process is executed jointly upon a plurality of said selectively grouped sets of image pixels, a representative linear combination of said core spectral signatures being determined for each of said selectively grouped sets of image pixels.

14. The system as recited in claim 11, wherein said decomposition process includes: a matching pursuits decomposition to generate a linear combination of said core spectral signatures for an individual pixel, and an adjustment of coefficients in said linear combination for statistical optimization thereof.

15. A method for processing electronically captured images formed by a plurality of spectral components comprising the steps of:
electronically capturing image data with complex spectral content, the image data including a plurality of image data vectors defined with respect to a spatial image plane;
establishing a plurality of candidate spectral components;
actuating a discovery processor to execute a simultaneous sparse approximation process upon image data vectors of at least a portion of the captured image, actuating the discovery processor to adaptively discover for the image data vectors a set of core spectral signatures defined in terms of candidate spectral components automatically selected from a general dictionary; and,
selectively matching at least one individual captured image data vector to at least a portion of said core spectral signature set to decompose said image data vector to a representation as a linear combination of the portion of said core spectral signature set;
whereby constituent features of the captured image portion corresponding to said selectively matched core spectral signatures are discriminated according to said linear combination thereof.

16. The method as recited in claim 15, wherein the image data is captured to include multi- or hyper-spectral pixels.

17. The method as recited in claim 15, wherein said simultaneous sparse approximation process is executed upon at least one selectively grouped set of image data vectors.

18. The method as recited in claim 17, wherein said simultaneous sparse approximation is of a greedy adaptive decomposition (GAD) type, said candidate spectral components being established within the general dictionary, said candidate spectral components each being defined either as a continuous function or as a discrete vector.

19. The method as recited in claim 18, wherein at least one set of selectively grouped image data vectors are disposed in spatially contiguous manner within the spatial image plane.

20. The method as recited in claim 19, wherein predetermined environmental factors when present in the captured image portion are parametrically discriminated by said simultaneous sparse approximation for discovering said core spectral signatures responsive thereto, said predetermined environmental factors including local artifacts and lighting variations between different portions of the spatial image plane.

21. The method as recited in claim 20, wherein said predetermined environmental factors include shadowing of light and local surface texture.

22. The method as recited in claim 18, wherein said simultaneous sparse approximation process is executed jointly upon a plurality of said selectively grouped sets of image data vectors, a representative linear combination of said core spectral signatures being determined for each of said selectively grouped sets of image data vectors.

23. The method as recited in claim 18, further comprising the step of maintaining a spectral signature dictionary updated responsive to said discovery processing to store said core spectral signatures discovered thereby.

24. The method as recited in claim 18, wherein said selective matching includes: a matching pursuits decomposition to generate a linear combination of said core spectral signatures for an individual image data vector, and an adjustment of coefficients in said linear combination for statistical optimization thereof.

25. The method as recited in claim 18, wherein said selective matching includes a simultaneous sparse approximation to decompose respective ones of said grouped image data vectors to generate a linear combination of said core spectral signatures for at least one of said grouped image data vectors.

26. The method as recited in claim 25, wherein said selective matching includes an adjustment of coefficients in said linear combination of said core spectral signatures for statistical optimization thereof.

27. The method as recited in claim 18, wherein said discovery processing includes selectively evaluating a set of candidate spectral components to discover said core spectral components therefrom, said selective evaluation including monitoring for disparity between coefficient values corresponding to respective ones of said candidate spectral components.

28. The method as recited in claim 18, wherein said discovery processing includes hypothesis testing for adjustably optimizing said core spectral signatures with respect to predetermined statistical criteria.

* * * * *